US011892830B2

(12) United States Patent
Fenstermacher et al.

(10) Patent No.: US 11,892,830 B2
(45) Date of Patent: Feb. 6, 2024

(54) RISK ASSESSMENT AT POWER SUBSTATIONS

(71) Applicant: Uptake Technologies, Inc., Chicago, IL (US)

(72) Inventors: David Fenstermacher, Chicago, IL (US); Victor R. Collazo, Chicago, IL (US)

(73) Assignee: UPTAKE TECHNOLOGIES, INC., Chicago, IL (US)

( * ) Notice: Subject to any disclaimer, the term of this patent is extended or adjusted under 35 U.S.C. 154(b) by 334 days.

(21) Appl. No.: 17/124,105

(22) Filed: Dec. 16, 2020

(65) Prior Publication Data

US 2022/0187817 A1 Jun. 16, 2022

(51) Int. Cl.
*G05B 23/02* (2006.01)
*G06N 7/01* (2023.01)

(52) U.S. Cl.
CPC ..... *G05B 23/0272* (2013.01); *G05B 23/0283* (2013.01); *G06N 7/01* (2023.01)

(58) Field of Classification Search
CPC ............ G05B 23/0272; G05B 23/0283; G05B 23/0251; G06N 7/005; G06N 20/00;
(Continued)

(56) References Cited

U.S. PATENT DOCUMENTS 5,566,092 A 10/1996 Wang et al.
5,633,800 A 5/1997 Bankert et al.
(Continued)

FOREIGN PATENT DOCUMENTS

WO 2011117570 9/2011
WO 2013034420 3/2013
(Continued)

OTHER PUBLICATIONS

Retterath, Brad, Ali A. Chowdhury, and Subrahmanyam S. Venkata. "Decoupled substation reliability assessment." 2004 International Conference on Probabilistic Methods Applied to Power Systems. IEEE, 2004. (Year: 2004).*

(Continued)

*Primary Examiner* — Carlos R Ortiz Rodriguez
(74) *Attorney, Agent, or Firm* — MARSHALL, GERSTEIN & BORUN LLP

(57) ABSTRACT

Disclosed herein is a data-driven approach for determining and presenting a more intelligent measure of the probability of failure of a substation. The disclosed approach generally involves (i) deriving respective failure probabilities of the individual assets within the substation by taking into consideration certain operating, environmental, maintenance or other types of data related to the individual assets, (ii) determining the electrical configuration of the substation, (iii) determining a substation failure probability based on the respective failure probabilities of the individual assets within the substation and the electrical configuration of the substation, and then (iv) presenting the probability of substation failure and/or the respective failure probabilities for the individual assets to a user in various ways. A user may use this probability of failure together with knowledge of the impact or consequence of a failure at the substation to make planning decisions for the substation or the electrical system.

20 Claims, 22 Drawing Sheets

(58) Field of Classification Search
CPC ........... G06Q 10/0635; G06Q 10/0875; G06Q 50/06; G06Q 10/20; Y04S 10/50
See application file for complete search history.

(56) References Cited

U.S. PATENT DOCUMENTS

| | | |
|---|---|---|
| 6,256,594 B1 | 7/2001 | Yamamoto et al. |
| 6,336,065 B1 | 1/2002 | Gibson et al. |
| 6,442,542 B1 | 8/2002 | Ramani et al. |
| 6,473,659 B1 | 10/2002 | Shah et al. |
| 6,622,264 B1 | 9/2003 | Bliley et al. |
| 6,634,000 B1 | 10/2003 | Jammu et al. |
| 6,643,600 B2 | 11/2003 | Yanosik et al. |
| 6,650,949 B1 | 11/2003 | Fera et al. |
| 6,725,398 B1 | 4/2004 | Varma et al. |
| 6,760,631 B1 | 7/2004 | Berkowitz et al. |
| 6,775,641 B2 | 8/2004 | Wegerich et al. |
| 6,799,154 B1 | 9/2004 | Aragones et al. |
| 6,823,253 B2 | 11/2004 | Brunell |
| 6,859,739 B2 | 2/2005 | Wegerich et al. |
| 6,892,163 B1 | 5/2005 | Herzog et al. |
| 6,947,797 B2 | 9/2005 | Dean et al. |
| 6,952,662 B2 | 10/2005 | Wegerich et al. |
| 6,957,172 B2 | 10/2005 | Wegerich |
| 6,975,962 B2 | 12/2005 | Wegerich et al. |
| 7,020,595 B1 | 3/2006 | Adibhatla et al. |
| 7,082,379 B1 | 7/2006 | Bickford et al. |
| 7,100,084 B2 | 8/2006 | Unkle et al. |
| 7,107,491 B2 | 9/2006 | Graichen et al. |
| 7,127,371 B2 | 10/2006 | Duckert et al. |
| 7,233,886 B2 | 6/2007 | Wegerich et al. |
| 7,280,941 B2 | 10/2007 | Bonanni et al. |
| 7,308,385 B2 | 12/2007 | Wegerich et al. |
| 7,373,283 B2 | 5/2008 | Herzog et al. |
| 7,403,869 B2 | 7/2008 | Wegerich et al. |
| 7,409,320 B2 | 8/2008 | Wegerich |
| 7,415,382 B1 | 8/2008 | Bickford et al. |
| 7,428,478 B2 | 9/2008 | Aragones |
| 7,447,666 B2 | 11/2008 | Wang |
| 7,457,693 B2 | 11/2008 | Olsen et al. |
| 7,457,732 B2 | 11/2008 | Aragones et al. |
| 7,509,235 B2 | 3/2009 | Bonissone et al. |
| 7,536,364 B2 | 5/2009 | Subbu et al. |
| 7,539,597 B2 | 5/2009 | Wegerich et al. |
| 7,548,830 B2 | 6/2009 | Goebel et al. |
| 7,634,384 B2 | 12/2009 | Eryurek et al. |
| 7,640,145 B2 | 12/2009 | Wegerich et al. |
| 7,660,705 B1 | 2/2010 | Meek et al. |
| 7,725,293 B2 | 5/2010 | Bonissone et al. |
| 7,739,096 B2 | 6/2010 | Wegerich et al. |
| 7,756,678 B2 | 7/2010 | Bonissone et al. |
| 7,822,578 B2 | 10/2010 | Kasztenny et al. |
| 7,869,908 B2 | 1/2011 | Walker |
| 7,919,940 B2 | 4/2011 | Miller et al. |
| 7,941,701 B2 | 5/2011 | Wegerich et al. |
| 7,962,240 B2 | 6/2011 | Morrison et al. |
| 8,024,069 B2 | 9/2011 | Miller et al. |
| 8,050,800 B2 | 11/2011 | Miller et al. |
| 8,145,578 B2 | 3/2012 | Pershing et al. |
| 8,229,769 B1 | 7/2012 | Hopkins |
| 8,234,420 B2 | 7/2012 | Lueckenbach et al. |
| 8,239,170 B2 | 8/2012 | Wegerich |
| 8,275,577 B2 | 9/2012 | Herzog |
| 8,285,402 B2 | 10/2012 | Lueckenbach et al. |
| 8,311,774 B2 | 11/2012 | Hines |
| 8,352,216 B2 | 1/2013 | Subbu et al. |
| 8,532,795 B2 | 9/2013 | Adavi et al. |
| 8,533,018 B2 | 9/2013 | Miwa et al. |
| 8,560,494 B1 | 10/2013 | Downing et al. |
| 8,620,618 B2 | 12/2013 | Eryurek et al. |
| 8,620,853 B2 | 12/2013 | Herzog |
| 8,626,385 B2 | 1/2014 | Humphrey |
| 8,645,276 B2 | 2/2014 | Wong et al. |
| 8,660,980 B2 | 2/2014 | Herzog |
| 8,689,108 B1 | 4/2014 | Duffield et al. |
| 8,713,467 B1 | 4/2014 | Goldenberg et al. |
| 8,786,605 B1 | 7/2014 | Curtis et al. |
| 8,799,799 B1 | 8/2014 | Cervelli et al. |
| 8,812,960 B1 | 8/2014 | Sun et al. |
| 8,832,594 B1 | 9/2014 | Thompson et al. |
| 8,850,000 B2 | 9/2014 | Collins et al. |
| 8,862,938 B2 | 10/2014 | Souvannarath |
| 8,868,537 B1 | 10/2014 | Colgrove et al. |
| 8,886,601 B1 | 11/2014 | Landau et al. |
| 8,909,656 B2 | 12/2014 | Kumar et al. |
| 8,917,274 B2 | 12/2014 | Ma et al. |
| 8,918,246 B2 | 12/2014 | Friend |
| 8,924,429 B1 | 12/2014 | Fisher et al. |
| 8,935,201 B1 | 1/2015 | Fisher et al. |
| 8,937,619 B2 | 1/2015 | Sharma et al. |
| 8,938,686 B1 | 1/2015 | Erenrich et al. |
| 2002/0091972 A1 | 7/2002 | Harris et al. |
| 2002/0152056 A1 | 10/2002 | Herzog et al. |
| 2003/0055666 A1 | 3/2003 | Roddy et al. |
| 2003/0126258 A1 | 7/2003 | Conkright et al. |
| 2004/0181712 A1 | 9/2004 | Taniguchi et al. |
| 2004/0243636 A1 | 12/2004 | Hasiewicz et al. |
| 2005/0119905 A1 | 6/2005 | Wong et al. |
| 2005/0222747 A1 | 10/2005 | Vhora et al. |
| 2007/0263628 A1 | 11/2007 | Axelsson et al. |
| 2008/0059080 A1 | 3/2008 | Greiner et al. |
| 2008/0059120 A1 | 3/2008 | Xiao et al. |
| 2012/0271612 A1 | 10/2012 | Barsoum et al. |
| 2012/0310597 A1 | 12/2012 | Uchiyama et al. |
| 2013/0010610 A1 | 1/2013 | Karthikeyan et al. |
| 2013/0024416 A1 | 1/2013 | Herzog |
| 2013/0283773 A1 | 10/2013 | Hague |
| 2013/0325502 A1 | 12/2013 | Robicsek et al. |
| 2014/0012886 A1 | 1/2014 | Downing et al. |
| 2014/0032132 A1 | 1/2014 | Stratton et al. |
| 2014/0060030 A1 | 3/2014 | Ma et al. |
| 2014/0089035 A1 | 3/2014 | Jericho et al. |
| 2014/0105481 A1 | 4/2014 | Hasselbusch et al. |
| 2014/0121868 A1 | 5/2014 | Zhang et al. |
| 2014/0169398 A1 | 6/2014 | Arndt et al. |
| 2014/0170617 A1 | 6/2014 | Johnson et al. |
| 2014/0184643 A1 | 7/2014 | Friend |
| 2014/0222355 A1 | 8/2014 | Cheim et al. |
| 2014/0330600 A1 | 11/2014 | Candas et al. |
| 2014/0330749 A1 | 11/2014 | Candas et al. |
| 2014/0351642 A1 | 11/2014 | Bates et al. |
| 2014/0357295 A1 | 12/2014 | Skomra et al. |
| 2014/0358601 A1 | 12/2014 | Smiley et al. |
| 2015/0046870 A1 | 2/2015 | Goldenberg et al. |
| 2015/0262060 A1 | 9/2015 | Husain et al. |
| 2017/0109223 A1 | 4/2017 | Höfig et al. |
| 2017/0118838 A1 | 4/2017 | Williams et al. |

FOREIGN PATENT DOCUMENTS

| | | |
|---|---|---|
| WO | 2014145977 | 9/2014 |
| WO | 2014205497 | 12/2014 |

OTHER PUBLICATIONS

J.I. Aizpurua et al. Supporting group maintenance through prognostics-enhanced dynamic dependability prediction. Reliability Engineering and System Safety 168. Apr. 21, 2017, 19 pages [online]. Retrieved from the Internet <URL: http://dx.doi.org/10.1016/j.ress.2017.04.005>.

J. Buhler et al. Long-Term Impact Evaluation of Maintenance Activities on MV/LV Substations. 2011 IEEE Trondheim PowerTech, Jun. 19, 2011, 9 pages [online]. Retrieved from the Internet <URL:https://ieeexplore.ieee.org/document/6019273>.

International Searching Authority International Search Report and Written Opinion for PCT/US2021/063592, dated Apr. 13, 2022, 11 pages.

Biswas, Trisha. Redundancy-based Approaches in Wireless Multihop Network Design. PhD Dissertation Submitted to Graduate Faculty of North Carolina State University, Raleigh, North Carolina, Mar. 25, 2014, pp. 1-141 [online], [retrieved on May 26, 2015]. Retrieved

(56) References Cited

OTHER PUBLICATIONS from the Internet <URL:https://repository.lib.ncsu.edu/bitstream/handle/1840.16/9313/etd.pdf?sequence=2&isAllowed=y>.

Isermann, Rolf. Model-based Fault Detection and Diagnosis—Status and Applications. Institute of Automatic Control. Darmstadt University of Technology, Darmstadt, Germany, Jun. 2004, pp. 1-12.[online], [retrieved on Oct. 8, 2015]. Retrieved from the Internet <URL: http://citeseerx.ist.psu.edu/viewdoc/download?doi=10.1.1.113.9295&rep=rep1&type=pdf>.

Narasimhan et al. Combining Model-Based and Feature-Driven Diagnosis Approaches—A Case Study on Electromechanical Actuators. 21st International Workshop on Principles of Diagnosis 2010, pp. 1-8. [online], [retrieved on Oct. 8, 2015] Retrieved from the Internet <URL:https://ti.arc.nasa.gov/publications/2266/download/>.

Prentzas et al. Categorizing Approaches Combining Rule-Based and Case-Based Reasoning. Expert Systems 24, Apr. 17, 2007, pp. 1-34 [online], [retrieved on Oct. 8, 2015]. Retrieved from the Internet <URL:http://citeseerx.ist.psu.edu/viewdoc/download?doi=10.1.1.143.2780&rep=rep 1&type=pdf>.

Infor M3 Enterprise Management System. Datasheet [online]. Infor, 2014 [retrieved May 19, 2015]. Retrieved from the Internet: < URL:www.infor.com.html>.

Infor Equipment. Datasheet [online]. Infor, 2012 [retrieved May 19, 2015]. Retrieved from the Internet :<URL:www.infor.com.html>.

Infor Introduces Next-Generation Solution for Equipment Dealers and Service Providers. Infor, Feb. 2014 pp. 1-5. [online], [retrieved May 19, 2015]. Retrieved from the Internet :<URL:www.infor.com/company/news/pressroom/pressreleases/M3equipment.html>.

Infor Equipment for Rental. Datasheet [online] Infor, 2013 [retrieved May 19, 2015]. Retrieved from the Internet :<URL: www.infor.com.html>.

Waltermire et al. Applying the Continuous Monitoring Technical Reference Model to the Asset, Configuration, and Vulnerability Management Domains (DRAFT). National Institute of Standards and Technology, U.S. Department of Commerce, Jan. 2012, pp. 1-23 [online], [retrieved Oct. 6, 2015]. Retrieved from the Internet: URL<https://csrc.nist.gov/CSRC/media/Publications/nistir/7800/draft/documents/Draft-NISTIR-7800.pdf.

* cited by examiner

Substation Dashboard

At-risk Assets

| Substation | Asset | Serial Number | Risk |
|---|---|---|---|
| AYAN | EC602 | K-6566182FA-202 | 10.44% |
| SUB Z | R-544 | 2-37Y2468 | 10.35% |
| JACKSON | CF601 | 2-31Y3226 | 10.20% |
| SUB O-44 | E-534 | 0139A9074-203 | 10.02% |
| SUB W | R-514 | 0139A9074-209 | 10.85% |
| SUB K | P-564 | 0202A9240-201 | 10.71% |
| SUB B | R-524 | 2-37Y2639 | 10.71% |
| SUB X-64 | E-564 | 4-37Y2639 | 10.71% |
| SUB X-64 | E-574 | 1-37Y2471 | 10.71% |
| SUB K | R-534 | 1-37Y2639 | 10.71% |

FIG. 16

RISK ASSESSMENT AT POWER SUBSTATIONS

BACKGROUND

Today, machines (also referred to herein as "assets") are ubiquitous in many industries. From locomotives that transfer cargo across countries to farming equipment that harvest crops, assets play an important role in everyday life. Depending on the role that an asset serves, its complexity, and cost, may vary.

Because of the increasing role that assets play, it is also becoming increasingly desirable to monitor and analyze the operation of assets in a given operating environment. To facilitate this, assets may be equipped with sensors that are configured to monitor various operating parameters of the asset and an on-asset computer that is configured to send data indicative of these operating parameters over a network to a central data analytics platform that is configured to analyze the data, in order to learn more about the operation of the assets.

OVERVIEW

Electric power systems are complex. Often, electric power systems are comprised of several hundreds or thousands of discrete assets of different makes and types spread out across an operating region and organized into facilities called substations. At a high level, these substations and assets are responsible for (i) generating electricity, (ii) transmitting the electricity across the operating region, and (iii) safely delivering it to the customers. Electric utility organizations are, among other things, tasked with operating and maintaining these electric power systems. But, given the complexity of these electric power systems, operating and maintaining the electric power systems is a difficult endeavor. Indeed, electric utility organizations spend a great deal of time and energy monitoring power substations in order to understand the risk present at these substations. Understanding the risk present at these substations can help electric utility organizations to understand how to most efficiently maintain and invest in improvements to the electric power system in order to minimize system downtime and/or interruptions in the delivery of electricity to customers.

Generally, two components are involved in the determination of risk at an electric power substation: (i) the probability of "substation failure," and (ii) the impact or consequence of such a failure. However, current techniques for determining substation failure are insufficiently accurate. This is because, today, determining the probability of substation failure generally only includes determining the probability that any given asset within the substation will fail (which is sometimes referred to herein as determining failure probability on an "asset-by-asset" basis). This tends not to be an accurate representation of the probability of failure of the entire substation because it is often the case that electric redundancy is built into the substations. In other words, it is often possible for one or more individual assets within a particular substation to fail yet the substation as a whole not fail because the redundancy of the substation is able to account and compensate for the failure of the one or more individual assets. Thus, it would be desirable to characterize the probability of substation failure at the substation level as opposed to only representing the failure probability of any one or more individual assets within the substation.

Moreover, the technique for determining the probability of failure of an individual asset within a substation tends also to be insufficiently accurate because the technique generally only considers the age of the asset. Assessing the probability of failure of an individual asset in this way fails to account for several aspects of the assets, such as an asset's individual history of operation and maintenance, among other possible aspects. Thus, it would also be desirable to utilize a technique for more accurately evaluating the failure probability of individual assets by considering additional data related to the assets, such as data related to the operation, maintenance, or other aspects of the assets.

Accordingly, in one aspect, disclosed herein is a method that involves (a) deriving a respective failure probability for each of a set of assets operating in a substation, (b) determining an electrical configuration of the substation, (c) determining a failure probability of the substation based on (i) the derived respective failure probability of each asset in the set of assets and (ii) the electrical configuration of the substation, and (d) presenting a visualization that includes an indication of one or more of (i) the respective failure probability for each asset of the set of assets operating in the substation, (ii) the determined electrical configuration of the substation, or (iii) the determined failure probability of the substation.

In another aspect, disclosed herein is a computing system that includes a network interface, at least one processor, a non-transitory computer-readable medium, and program instructions stored on the non-transitory computer-readable medium that are executable by the at least one processor to cause the computing system to carry out the functions disclosed herein, including but not limited to the functions of the foregoing method.

In yet another aspect, disclosed herein is a non-transitory computer-readable storage medium provisioned with software that is executable to cause a computing system to carry out the functions disclosed herein, including but not limited to the functions of the foregoing method.

One of ordinary skill in the art will appreciate these as well as numerous other aspects in reading the following disclosure.

BRIEF DESCRIPTION OF THE DRAWINGS

FIG. 16 is a snapshot of an example GUI depicting a visualization of an example electric power substation risk listing.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. Example Environment

Figure 1:
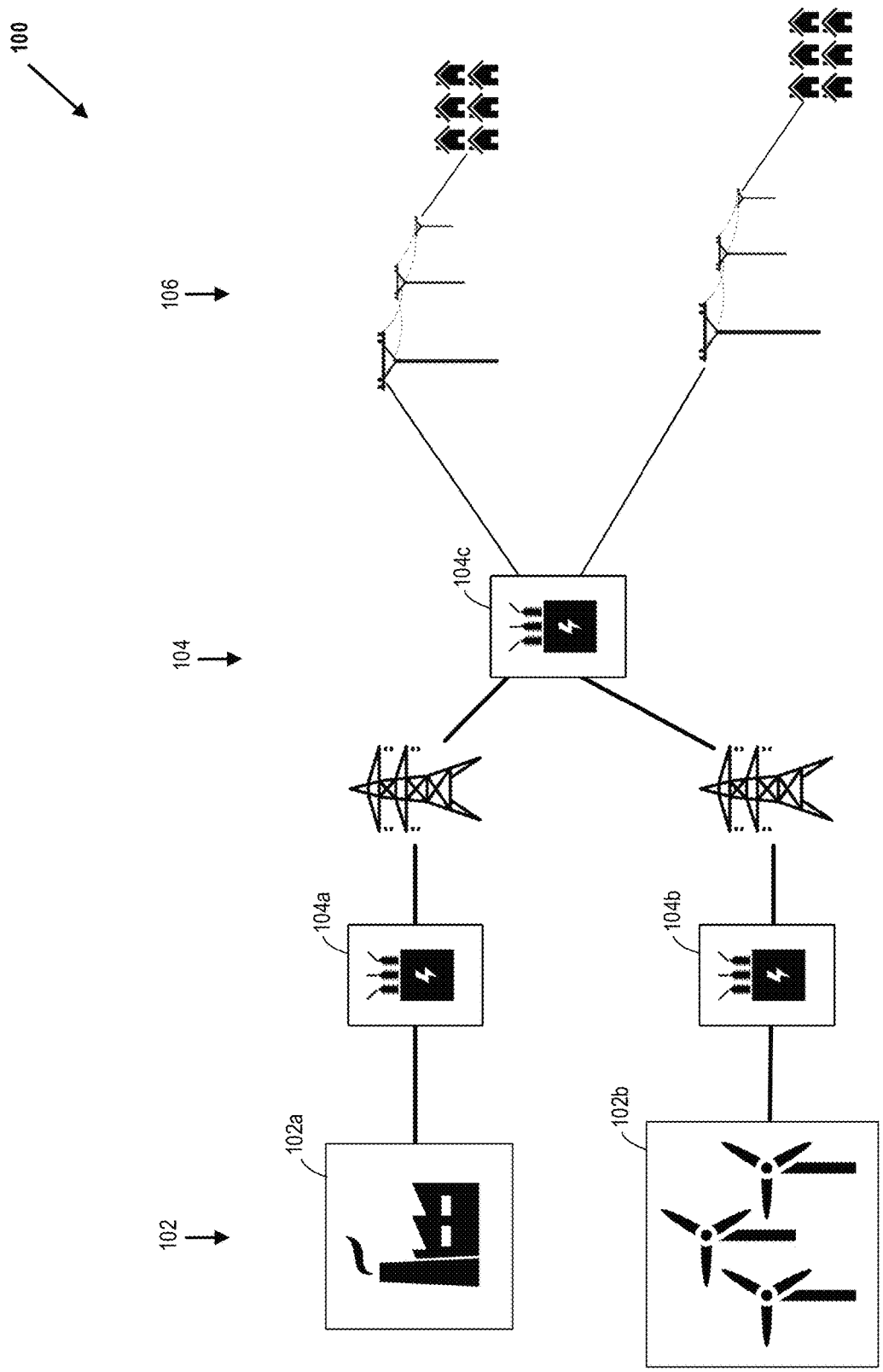
FIG. 1 depicts an example electric power transmission system in which example embodiments may be implemented.

Turning now to the figures, FIG. 1 depicts a simplified example portion of a power transmission system 100, sometimes referred to generally as a "power grid" or the like, in which one or more of the example embodiments disclosed herein may be utilized. As depicted, the example transmission system 100 includes a generation potion 102, a transmission portion 104, and a distribution portion 106. At a high level, the generation portion is responsible for generating electric power and providing it to the power transmission system. The transmission portion is responsible for transmitting the electric power (typically over relatively long distances) from the generation portion to the general locale of the customers who use the electric power. And the distribution portion is responsible for providing the electric power directly to the end customers in the format that they are accustomed to receiving.

At a more granular level, but still by way of example, the generation portion 102 may include, for instance, power generating facilities 102a and 102b, which may include any type of facility or apparatus that generates electricity and provides it to the electric power grid, examples of which may include a fossil-fuel burning power generation facility 102a and a wind-powered electric generation network 102b. Electricity generated via these facilities or apparatuses may be provided to the transmission system 100 generally by way of a corresponding substation 104a and 104b. From there, the electric power may be transmitted throughout the network and, to at least a distribution substation, such as substation 104c, where the electric power is further distributed to the distribution network 106 and ultimately some end customers.

As a general matter, a substation is a facility that receives electric power in the form of electricity and manipulates it in some way, such as by transforming the voltage of the received electric power, and/or by dividing the electric power and sending it along to additional portions of the power transmission system. For instance, some substations, like substations 104a and 104b may be configured to receive electric power from a generation facility, step up the voltage of this electric power via one or more electric power transformers, and send the high-voltage electric power on to one or more long-range power transmission lines. Other substations, like substation 104c, may be configured to receive high-voltage electric power from one or more high-voltage transmission lines, step down the voltage of this electric power, and provide the electric power to one or more distribution networks, such as distribution network 106, where the electric power routed to customers, like residences, businesses, and industries. Still other substations may be configured to manipulate the electric power in other ways, such as by adding or subtracting reactive power to the network, adding redundancy to the network, or acting as a switch to re-route electric power in times of heavy usage.

Substations generally include many different pieces of equipment arranged in a way that allows the substation to carry out the function or functions desired. These pieces of equipment within a substation may generally be referred to as assets in the power industry, with some representative types of assets including, for instance, transformers, circuit breakers, switches, relays, capacitor banks, lightning arrestors, and feeder units, among many other different types of equipment. An asset may have various other characteristics that more specifically define the type of asset, examples of which may include the asset's brand, make, model, vintage, and/or software version, among other possibilities. In this respect, depending on the implementation, the assets included in substations throughout a power transmission system may either be of the same type or various different types.

Figure 2:
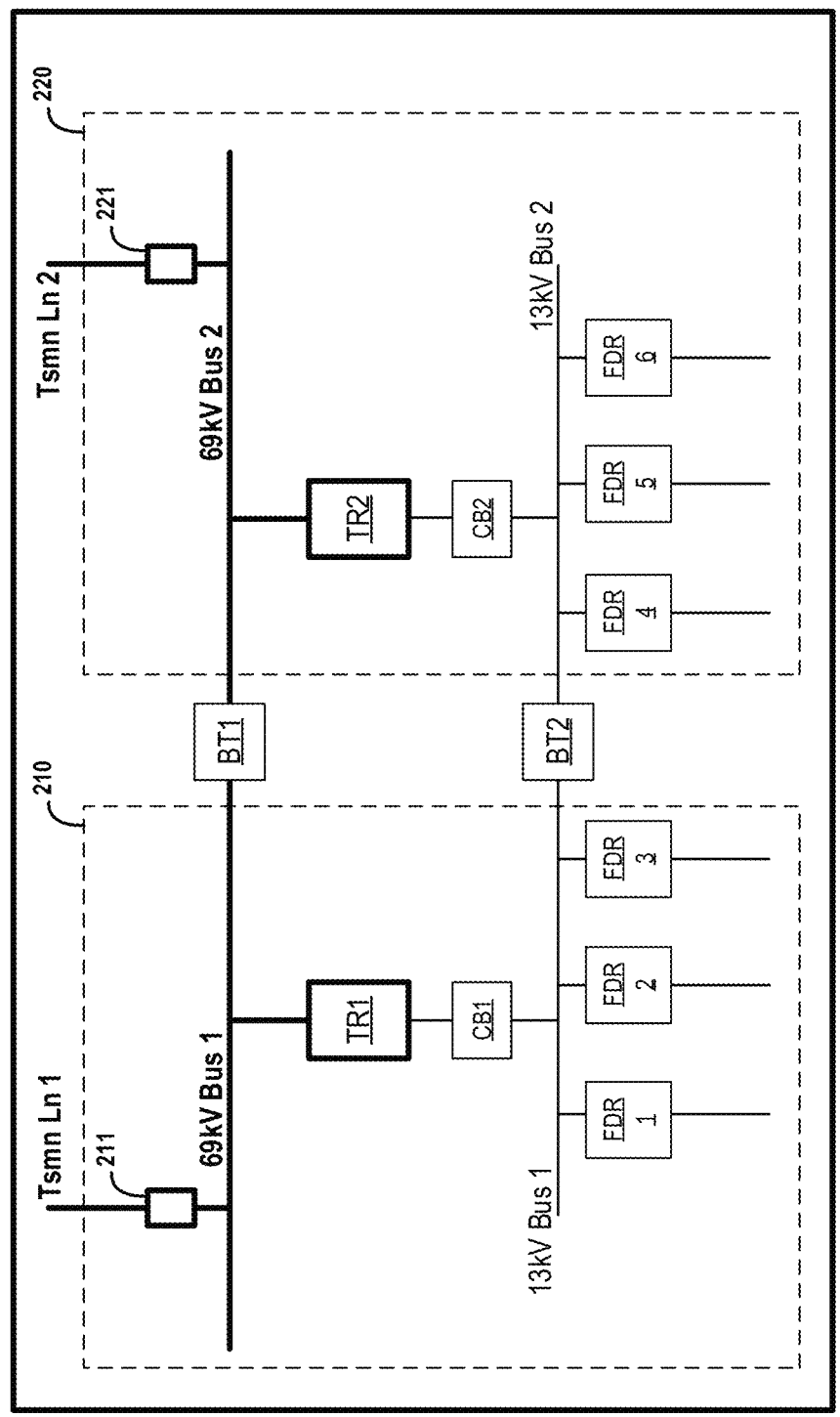
FIG. 2 depicts a simplified block diagram of an example electric power substation for which example embodiments may be implemented.

To help illustrate how different types of assets may be arranged in a substation, FIG. 2 depicts a simplified schematic of a substation 200 with various types of assets that may be arranged to allow substation 200 to carry out the functions desired of a substation in a power transmission system (e.g., substation 104c depicted in transmission system 100 in FIG. 1). As depicted, the assets in substation 200 may include high-voltage circuit breakers 211 and 221, bus-tie circuit breakers BT1 and BT2, transformers TR1 and TR2, circuit breakers CB1 and CB2, and feeders FDR1-6, although in other substation other assets and other arrangements of assets are possible as well. In this way, power may flow into substation 200 via high-voltage transmission lines Tsmn Ln 1 and Tsmn Ln 2 and may flow onto 69 kV Bus 1 and 69 kV Bus 2. From there, power may flow through transformers TR1 and TR2 where the voltage is stepped down from 69 kV to 13 kV, and on to 13 kV Bus 1 and 13 kV Bus 2. Finally, from there, power may flow from 13 kV Bus 1 and 13 kV Bus 2 through the substation outputs via feeders FDR1-6 where it may be routed to various distribution networks and ultimately on to end customers. Those skilled in the art will appreciate that substation 200 is merely one example arrangement of substation assets; many other arrangements of these and other substation assets are possible.

Figure 3:
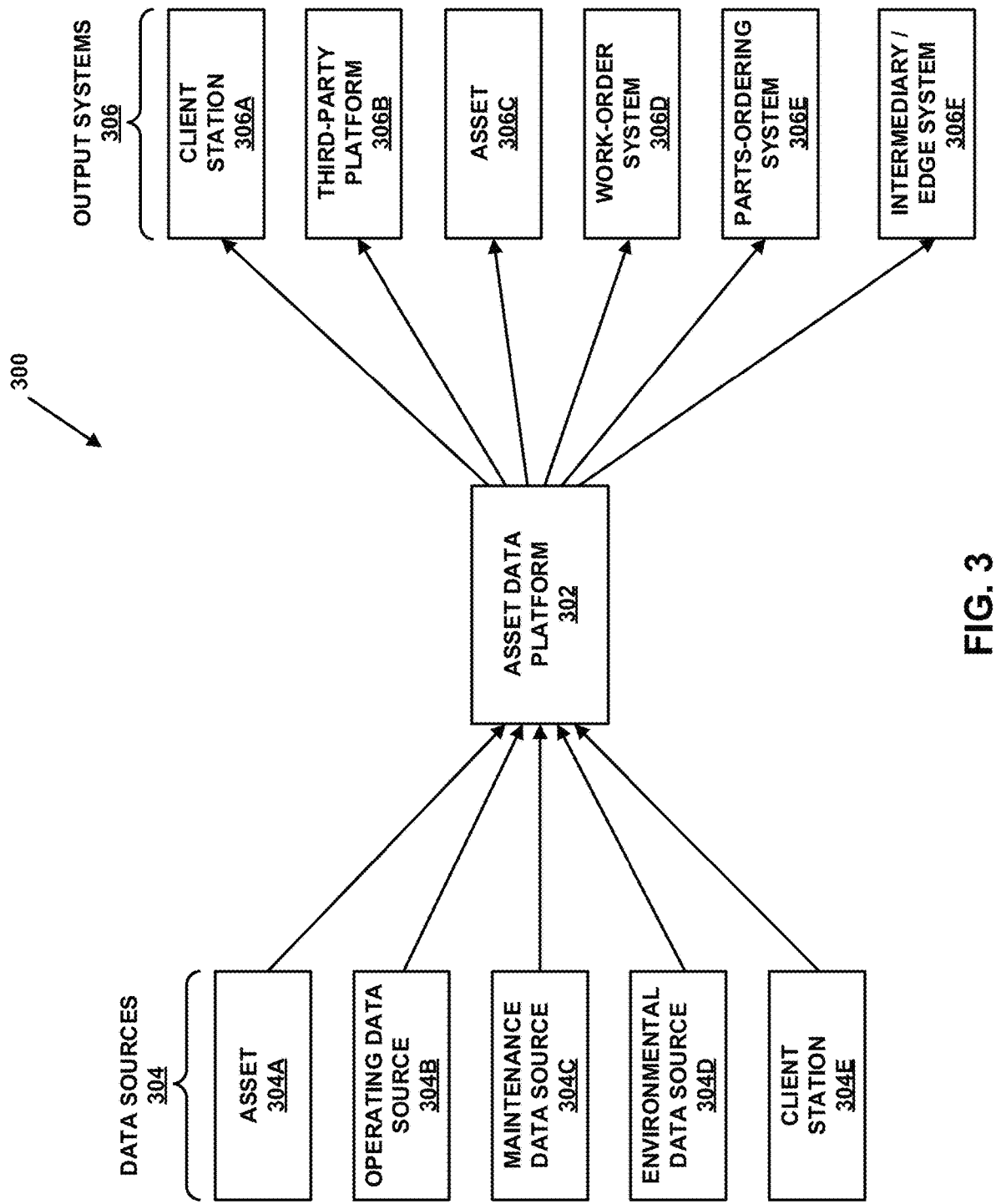
FIG. 3 depicts a simplified block diagram of an example data network in which example embodiments may be implemented.

Turning next to FIG. 3, FIG. 3 depicts an example network configuration 300 in which the example embodiments disclosed herein may be implemented. As shown, network configuration 300 includes at its core a central computing system 302, which may be communicatively coupled to one or more data sources 304 and one or more output systems 306 via respective communication paths. In such an arrangement, central computing system 302 may generally serve as an "asset data platform" that is configured to perform functions to facilitate the monitoring, analysis, and/or management of various types of assets, which, as mentioned, may take various forms.

Broadly speaking, asset data platform 302 may comprise one or more computing systems that have been provisioned with software for carrying out one or more of the platform functions disclosed herein, including but not limited to receiving data related to the operation and/or management of assets (broadly referred to herein as "asset-related data") from data sources 304, performing data ingestion and/or data analytics operations on the asset-related data received from asset data sources 304, and then outputting data and/or instructions related to the operation and/or management of assets to output systems 306. The one or more computing systems of asset data platform 302 may take various forms and be arranged in various manners.

For instance, as one possibility, asset data platform 302 may comprise computing infrastructure of a public, private, and/or hybrid cloud (e.g., computing and/or storage clusters) that has been provisioned with software for carrying out one or more of the platform functions disclosed herein. In this respect, the entity that owns and operates asset data platform 302 may either supply its own cloud infrastructure or may obtain the cloud infrastructure from a third-party provider of "on demand" computing resources, such include Amazon Web Services (AWS), Microsoft Azure, Google Cloud, Alibaba Cloud, or the like. As another possibility, asset data platform 302 may comprise one or more dedicated servers that have been provisioned with software for carrying out one or more of the platform functions disclosed herein. Other implementations of asset data platform 302 are possible as well.

Further, in practice, the software for carrying out the disclosed platform functions may take various forms. As one possibility, the platform software may comprise executable program instructions that cause asset data platform 302 to perform data ingestion operations on asset-related data received from data sources 304, including but not limited to extraction, transformation, and loading operations, among other examples. As another possibility, the platform software may comprise executable program instructions that cause asset data platform 302 to perform data analytics operations based on the asset-related data received from data sources 304, including but not limited to failure prediction, anomaly detection, noise filtering, predictive recommendations, and label correction, among other examples. As yet another possibility, the platform software may comprise executable program instructions that cause asset data platform 302 to output data and/or instructions related to the operation and/or management of assets for receipt by one or more output systems 306.

As one specific example, the platform software may comprise executable program instructions for outputting data related to the operation and/or management of assets that is to be presented to a user (e.g., asset-related data received from data sources 304 and/or the results of the data analytics operations performed by asset data platform 302), and these program instructions may take the form of discrete "applications" that are each tailored for particular end users, particular groups of assets, and/or particular purposes. Some representative examples of such applications may include an asset performance management application, a service optimization application, and an asset dealer operations application, among other possibilities.

The software for carrying out the disclosed platform functions may take various other forms as well.

As described above, asset data platform 302 may be configured to receive asset-related data from one or more data sources 304. These data sources—and the asset-related data output by such data sources—may take various forms. To illustrate, FIG. 3 shows some representative examples of data sources 304 that may provide asset-related data to asset data platform 302, which are discussed in further detail below. However, it should be understood that these example data sources are merely provided for purposes of illustration, and that asset data platform 302 may be configured to receive asset-related data from other types of data sources as well.

For instance, one type of data source 304 may take the form of an asset 304A, which may be equipped with components that are configured to capture data that is indicative of the operation of the asset—referred to herein as "operating data"—and then transmit the asset's operating data to asset data platform 302 over the respective communication path between asset 304A and asset data platform 302. In this respect, asset 304A may take any of the various forms described above, including but not limited to a transformer, circuit breaker, or feeder, among many other types of assets. Further, it should be understood that the components of asset 304A for capturing and transmitting the asset's operating data either may be included as part of asset 304A as manufactured or may be affixed to asset 304A at some later date, among other possibilities.

The operating data that is captured and sent by asset 304A may take various forms. As one possibility, an asset's operating data may include sensor data that comprises time-series measurements for certain operating parameters of the asset, examples of which may include temperature, pressure, vibration, fluid level, voltage, current, magnetic field, electric field, among many others. As another possibility, an asset's operating data may include abnormal-conditions data that indicates occurrences of discrete abnormal conditions at the asset, examples of which include fault codes that indicate the occurrence of certain faults at the asset (e.g., when an operating parameter exceeds a threshold), asset shutdown indicators, and/or other types of abnormal-condition indicators. As yet another possibility, an asset's operating data may include data that has been derived from the asset's sensor data and/or abnormal-conditions data, examples of which may include "roll-up" data (e.g., an average, mean, median, etc. of the raw measurements for an operating parameter over a given time window) and "features" data (e.g., data values that are derived based on the raw measurements of two or more of the asset's operating parameters). An asset's operating data may take various other forms as well.

In practice, an asset's operating data may also include or be associated with data that identifies the origin of the operating data. This origin data may take various forms. For example, such origin data may include identifying information for the originating asset (e.g., an asset ID and/or data indicating the asset's type, brand, make, model, age, software version, etc.) and/or identifying information for the component of asset 304A that captured the operating data (e.g., a sensor ID), among other possibilities. As another example, such origin data may include data indicating the time at which the operating data was captured (e.g., a timestamp) and/or the asset's location when the operating data was captured, to the extent that such location is not otherwise included in the operating data. Asset data platform 302 may receive other types of data from asset 304A as well.

Further, asset data platform 302 may be configured to receive operating data from asset 304A in various manners. As one possibility, asset 304A may be configured to send its operating data to asset data platform 302 in a batch fashion, in which case asset data platform 302 may receive periodic transmissions of operating data from asset 304A (e.g., on an hourly, daily, or weekly basis). As another possibility, asset data platform 302 may receive operating data from asset 304A in a streaming fashion as such operating data is captured by asset 304A. As yet another possibility, asset data platform 302 may receive operating data from asset 304A in response to sending a request for such data to asset 304A, in which case asset data platform 302 may be configured to periodically send requests for operating data to asset 304A. Asset data platform 302 may be configured to receive operating data from asset 304A in other manners as well.

Another type of data source 304 may take the form of operating data source 304B, which may comprise a computing system that is configured to receive operating data from one or more upstream sources of operating data (e.g., assets) and then provide this operating data to asset data platform 302 over the respective communication path between operating data source 304B and asset data platform 302. Such an operating data source may take various forms. As one possibility, operating data source 304B may comprise an existing data platform of a third-party organization that receives and/or maintains operating data for one or more assets, such as a data platform operated by an asset owner, an asset dealer, an asset manufacturer, an asset repair shop, or the like. As another possibility, operating data source 304B may comprise an intermediary system that compiles operating data from a plurality of upstream sources of operating data and then provides that compiled operating data to asset data platform 302, such as process historian systems (e.g., OSISoft PI, AspenTech IP.21, Honeywell PHD, etc.), or a system configured to engage in supervisory control and data acquisition (SCADA). For example, such an intermediary system may among other possibilities take the form of a computing system that is configured to compile operating data maintained by several third-party data platforms, or a computing system located in proximity to assets (e.g., at a substation) that is configured to compile operating data for the assets. Such a device may be referred to as an "edge computing device." In some embodiments, for instance, such an edge computing device may contain certain software that is programmed to monitor the asset for various conditions (e.g., an abnormal condition or a normal condition) and periodically (or otherwise) send indications of these conditions along with perhaps other data to asset data platform 302. Operating data source 304B may take other forms as well.

The operating data that is maintained and sent by operating data source 304B may take various forms, including but not limited to any of the forms described above. In addition to the operating data received from the one or more upstream sources, the operating data provided by operating data source 304B may also include additional operating data that is generated by operating data source 304B itself, such as operating data that operating data sources 304B derives based on the operating data received from the one or more upstream sources (e.g., abnormal-conditions data, roll-up data, features data, etc.).

Further, as with asset 304A, asset data platform 302 may be configured to receive operating data from operating data source 304B in various manners. As one possibility, operating data source 304B may be configured to send its operating data to asset data platform 302 in a batch fashion, in which case asset data platform 302 may receive periodic transmissions of operating data from operating data source 304B (e.g., on an hourly, daily, or weekly basis, or on an event-triggered basis (such as when a particular condition is detected)). As another possibility, asset data platform 302 may receive operating data from operating data source 304B in a streaming fashion as such operating data is received and/or otherwise generated by operating data source 304B. As yet another possibility, asset data platform 302 may receive operating data from operating data source 304B in response to sending a request for such data to operating data source 304B, in which case asset data platform 302 may be configured to periodically send requests for operating data to operating data source 304B. As still another possibility, asset data platform 302 may receive operating data from operating data source 304B by accessing an Application Programming Interface (API) that has been made available by operating data source 304B, subscribing to a service provided by operating data source 304B, or the like. Asset data platform 302 may be configured to receive operating data from operating data source 304B in other manners as well.

Yet another type of data source 304 may take the form of an asset maintenance data source 304C, which may comprise a computing system that is configured to generate and/or receive data related to the maintenance of a plurality of assets—referred to herein as "maintenance data"—and then send this maintenance data to asset data platform 302 over the respective communication path between asset maintenance data source 304C and asset data platform 302. In this respect, asset maintenance data source 304C may take various forms. As one possibility, asset maintenance data source 304C may comprise an existing data platform of a third-party organization that is interested in tracking the maintenance of assets, such as an asset owner, asset manufacturer, asset repair organization, or the like. As another possibility, asset maintenance data source 304C may comprise an intermediary system that compiles asset maintenance data from multiple upstream sources (e.g., multiple repair organizations) and then provides that compiled maintenance data to asset data platform 302. Asset maintenance data source 304C may take other forms as well.

The asset maintenance data that is maintained and sent by asset maintenance data source 304C may take various forms. As one example, the asset maintenance data may include details regarding inspections, maintenance, servicing, and/or repairs that have been performed or are scheduled to be performed on assets (e.g., work order data). As another example, the asset maintenance data may include details regarding known occurrences of failures at assets (e.g., date of failure occurrence, type of failure occurrence, etc.). Other examples are possible as well. As with the operating data, the asset maintenance data may also include or be associated with data indicating the origins of the asset maintenance data (e.g., source identifier, timestamp, etc.).

Further, asset data platform 302 may be configured to receive operating data from asset maintenance data source 304C in various manners, including but not limited to any of the manners discussed above with respect to operating data source 304B. In particular, one way asset data platform 302 may receive operating data from asset maintenance data source 304C is via file export. For instance, a SME or other user may manually export maintenance data from maintenance data source 304C to a file (e.g., comma-separated value format) and then provide that file to the asset data platform 302.

Still another type of data source 304 may take the form of environmental data source 304D, which may comprise a computing system that is configured to generate and/or receive data about an environment in which assets operate—referred to herein as "environmental data"—and then send this data to asset data platform 302 over the respective communication path between environmental data source 304D and asset data platform 302. In this respect, environmental data source 304D—and the environmental data provided thereby—may take various forms.

As one possibility, environmental data source 304D may take the form of a weather data source that provides information regarding the weather at locations where assets operate (e.g., ambient temperature, air pressure, humidity, wind direction, wind speed, etc.). As another possibility, environmental data source 304D may take the form of a geospatial data source that provides information regarding the geography and/or topology at locations where assets operate. As yet another possibility, environmental data source 304D may take the form of a satellite image data source that provides satellite imagery for locations where assets operate. Environmental data source 304D may take other forms as well.

Further, in practice, asset data platform 302 may be configured to receive operating data from asset environmental data source 304D in various manners, including but not limited to any of the manners discussed above with respect to operating data source 304B.

Another type of data source 304 may take the form of client station 304E, which may comprise any computing device that is configured to receive user input related to the operation and/or management of assets (e.g., information entered by a user, a repair technician, or the like) and then send that user input to asset data platform 302 over the respective communication path between client station 304E and asset data platform 302. In this respect, client station 304E may take any of various forms, examples of which may include a desktop computer, a laptop, a netbook, a tablet, a smartphone, and/or a personal digital assistant (PDA), among other possibilities.

The user input that is entered into client station 304E and sent to asset data platform 302 may comprise various different kinds of information, including but not limited to the kinds of information discussed above with respect to the other data sources. For instance, as one possibility, the user input may include certain kinds of operating data, maintenance data, and/or environmental data that may be input into asset data platform 302 by a user rather than being received from one of the aforementioned data sources. As another possibility, the user input may include certain user-defined settings or logic that is to be used by asset data platform 302 when performing data ingestion and/or data analytics operations. The user input that is entered into client station 304E and sent to asset data platform 302 may take various other forms as well.

The aforementioned data sources 304 are merely provided for purposes of illustration, and it should be understood that the asset data platform's data sources may take various other forms as well. For instance, while FIG. 3 shows several different types of data sources 304, it should be understood that asset data platform 302 need not be configured to receive asset-related data from all of these different types of data sources, and in fact, asset data platform 302 could be configured to receive asset-related data from as little as a single data source 304. Further, while data sources 304A-E have been shown and described separately, it should be understood that these data sources may be combined together as part of the same physical computing system (e.g., an organization's existing data platform may serve as both operating data source 304B and maintenance data source 304C). Further yet, it should be understood that asset data platform 302 may be configured to receive other types of data related to the operation and/or management of assets as well, examples of which may include asset management data (e.g., operational plans), enterprise data, and/or electric power demand forecasts, among other possibilities.

As shown in FIG. 3, asset data platform 302 may also be configured to output asset-related data and/or instructions for receipt by one or more output systems 306. These output systems—and the data and/or instructions provided to such output systems—may take various forms. To illustrate, FIG. 3 shows some representative examples of output systems 306 that may receive asset-related data and/or instructions from asset data platform 302, which are discussed in further detail below. However, it should be understood that these example output systems are merely provided for purposes of illustration, and that asset data platform 302 may be configured to output asset-related data and/or instructions to other types of output systems as well.

For instance, one type of output system 306 may take the form of client station 306A, which may comprise any computing device that is configured to receive asset-related data from asset data platform 302 over the respective communication path between client station 306A and asset data platform 302 and then present such data to a user (e.g., via a front-end application that is defined by asset data platform 302). In this respect, client station 306A may take any of various forms, examples of which may include a desktop computer, a laptop, a netbook, a tablet, a smartphone, and/or a PDA, among other possibilities. Further, it should be understood that client station 306A could either be a different device than client station 304E or could be the same device as client station 304E.

The asset-related data that is output for receipt by client station 306A may take various forms. As one example, this asset-related data may include a restructured version of asset-related data that was received by asset data platform

302 from one or more data sources 304 (e.g., operating data, maintenance data, etc.). As another example, this asset-related data may include data that is generated by asset data platform 302 based on the asset-related data received from data sources 304, such as data resulting from the data analytics operations performed by asset data platform 302 (e.g., derived failure probabilities, recommendations, alerts, etc.). Other examples are possible as well.

Along with the asset-related data that is output for receipt by client station 306A, asset data platform 302 may also output associated data and/or instructions that define the visual appearance of a front-end application (e.g., a graphical user interface (GUI)) through which the asset-related data is to be presented on client station 306A. Such data and/or instructions for defining the visual appearance of a front-end application may take various forms, examples of which may include Hypertext Markup Language (HTML), Cascading Style Sheets (CSS), and/or JavaScript, among other possibilities. However, depending on the circumstance, it is also possible that asset data platform 302 may output asset-related data to client station 306A without any associated data and/or instructions for defining the visual appearance of a front-end application.

Further, client station 306A may receive asset-related data from asset data platform 302 in various manners. As one possibility, client station 306A may send a request to asset data platform 302 for certain asset-related data and/or a certain front-end application, and client station 306A may then receive asset-related data in response to such a request. As another possibility, asset data platform 302 may be configured to "push" certain types of asset-related data to client station 306A, such as scheduled or event-based alerts, in which case client station 306A may receive asset-related data from asset data platform 302 in this manner. As yet another possibility, asset data platform 302 may be configured to make certain types of asset-related data available via an API, a service, or the like, in which case client station 306A may receive asset-related data from asset data platform 302 by accessing such an API or subscribing to such a service. Client station 306A may receive asset-related data from asset data platform 302 in other manners as well.

Another type of output system 306 may take the form of a data platform 306B operated by a third-party organization that may be interested in the operation and/or management of assets, such as an asset owner, an asset manufacturer, an asset repair organization, or the like. For instance, a third-party organization such as this may have its own data platform 306B that already enables users to access and/or interact with asset-related data through front-end applications that have been created by the third-party organization, but data platform 306B may not be programmed with the capability to ingest certain types of asset-related data or perform certain types of data analytics operations. In such a scenario, asset data platform 302 may be configured to output certain asset-related data for receipt by data platform 306B.

The asset-related data that is output for receipt by data platform 306B may take various forms, including but not limited any of the forms described above in connection with the output to client station 306A. However, unlike for client station 304A, the asset-related data that is output for receipt by data platform 306B typically need not include any associated data and/or instructions for defining the visual appearance of a front-end application, because data platform 306B may be performing operations on the asset-related data from asset data platform 302 beyond presenting it to a user via a front-end application.

Further, data platform 306B may receive asset-related data from asset data platform 302 in various manners, including but not limited to any of the manners discussed above with respect to client station 306A (e.g., by sending a request to asset data platform 302, having data "pushed" by asset data platform, or accessing an API or service provided by asset data platform 302).

Yet another type of output system 306 may take the form of asset 306C, which may be equipped with components that are configured to receive asset-related data and/or instructions from asset data platform 302 and then act in accordance with the received data and/or instructions. In this respect, asset 306C may take any of the various forms described above, among other types of assets. Further, it should be understood that asset 306C could either be a different asset than asset 304A or could be the same asset as asset 304A.

The asset-related data and/or instructions that are output for receipt by asset 306C may take various forms. As one example, asset data platform 302 may be configured to send asset 306C certain data that has been generated by asset data platform 302 based on the asset-related data received from data sources 304, such as data resulting from a data analytics operation performed by asset data platform 302 (e.g., derived failure probabilities, recommendations, alerts, etc.), in which case asset 306C may receive this data and then potentially adjust its operation in some way based on the received data. As another example, asset data platform 302 may be configured to generate and send an instruction for asset 306C to adjust its operation in some way (e.g., based on the asset-related data received from data sources 304), in which case asset 306C may receive this instruction and then potentially adjust its operation in accordance with the instruction. As yet another example, asset data platform 302 may be configured to generate and send an instruction for asset 306C to perform a data analytics operation locally at asset 306C, in which case asset 306C may receive the instruction and then locally perform the data analytics operation. In some cases, in conjunction with sending asset 306C an instruction to perform a data analytics operation, asset data platform 302 may also provide asset 306C with executable program instructions and/or program data that enable asset 306C to perform the data analytics operation (e.g., a predictive model). However, in other cases, asset 306C may already be provisioned with executable program instructions for performing the data analytics operation. Other examples are possible as well.

Further, in practice, asset 306C may receive asset-related data and/or instructions from asset data platform 302 in various manners, including but not limited to any of the manners discussed above with respect to client station 306A.

Still another type of output system 306 may take the form of work-order system 306D, which may comprise a computing system that is configured to receive asset-related data and/or instructions from asset data platform 302 over the respective communication path between work-order system 306D and asset data platform 302 and then generate in accordance with the received data and/or instructions a request to investigate, troubleshoot, or repair an asset (any one of which may be referred to generally as a "work order" or "work order data").

A further type of output system 306 may take the form of parts-ordering system 306E, which may comprise a computing system that is configured to receive asset-related data and/or instructions from asset data platform 302 over the respective communication path between parts-ordering system 306E and asset data platform 302 and then generate a parts order in accordance with the received data and/or instructions.

Yet another type of output system 306 may take the form of an intermediary or edge system 306F, which may comprise a computing system that is configured to receive asset-related data and/or instructions from asset data platform 302 over the respective communication path between intermediary or edge system 306F and asset data platform 302 and then either relay the data or instructions to asset 306C (or some other system) or perform some other action in connection with asset 306C. In this respect, intermediary or edge system 306F may take the form of a SCADA system to which the asset data platform 302 may transmit commands that instruct the SCADA system to cause asset 306 (or some other asset or mechanism) to take some action. To illustrate with a specific scenario, in operation, asset data platform 302 may make a determination that a particular transformer asset should be taken out of service. To effect this, the asset data platform may transmit a command (or series of commands) to an intermediary or edge system 306F in order to cause certain circuit breakers or switches to operate in order to electrically isolate the particular transformer asset at issue. Other examples of commands or other data that may be sent from asset data platform 302 to intermediary or edge system 306F are possible as well.

The aforementioned output systems 306 are merely provided for purposes of illustration, and it should be understood that output systems in communication with asset data platform 302 may take various other forms as well. For instance, while FIG. 3 shows several different types of output systems 306, it should be understood that asset data platform 302 need not be configured to output asset-related data and/or instructions for receipt by all of these different types of output systems, and in fact, asset data platform 302 could be configured to output asset-related data and/or instructions for receipt by as little as a single output system 306. Further, while output systems 306A-E have been shown and described separately, it should be understood that these output systems may be combined together as part of the same physical computing system. Further yet, it should be understood that asset data platform 302 may be configured to output asset-related data and/or instructions for receipt by other types of output systems as well.

As discussed above, asset data platform 302 may communicate with the one or more data sources 304 and one or more output systems 306 over respective communication paths. Each of these communication paths may generally comprise one or more communication networks and/or communications links, which may take any of various forms. For instance, each respective communication path with asset data platform 302 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path with asset data platform 302 may be wireless, wired, or some combination thereof, and may carry data according to any of various different communication protocols.

Although not shown, the respective communication paths with asset data platform 302 may also include one or more other intermediate systems. For example, it is possible that a given data source 304 may send asset-related data to one or more other intermediary systems, such as an aggregation system, and asset data platform 302 may then be configured to receive the asset-related data from the one or more other intermediary systems. As another example, it is possible that asset data platform 302 may communicate with a given output system 306 via one or more intermediary systems, such as a host server (not shown). Moreover, communication that takes place between the asset data platform and the one or more data sources 304 and/or the one or more output systems 306 may not take place entirely electronically, but rather take place at least in part through a manual process. For instance, as mentioned above, a user may manually export data from a system to an electronic file (such as a Microsoft Excel file) and then upload that file to another system. Many other configurations are also possible.

It should be understood that network configuration 300 is one example of a network configuration in which embodiments described herein may be implemented. Numerous other arrangements are possible and contemplated herein. For instance, other network configurations may include additional components not pictured and/or more or less of the pictured components.

II. Example Platform

Figure 4:
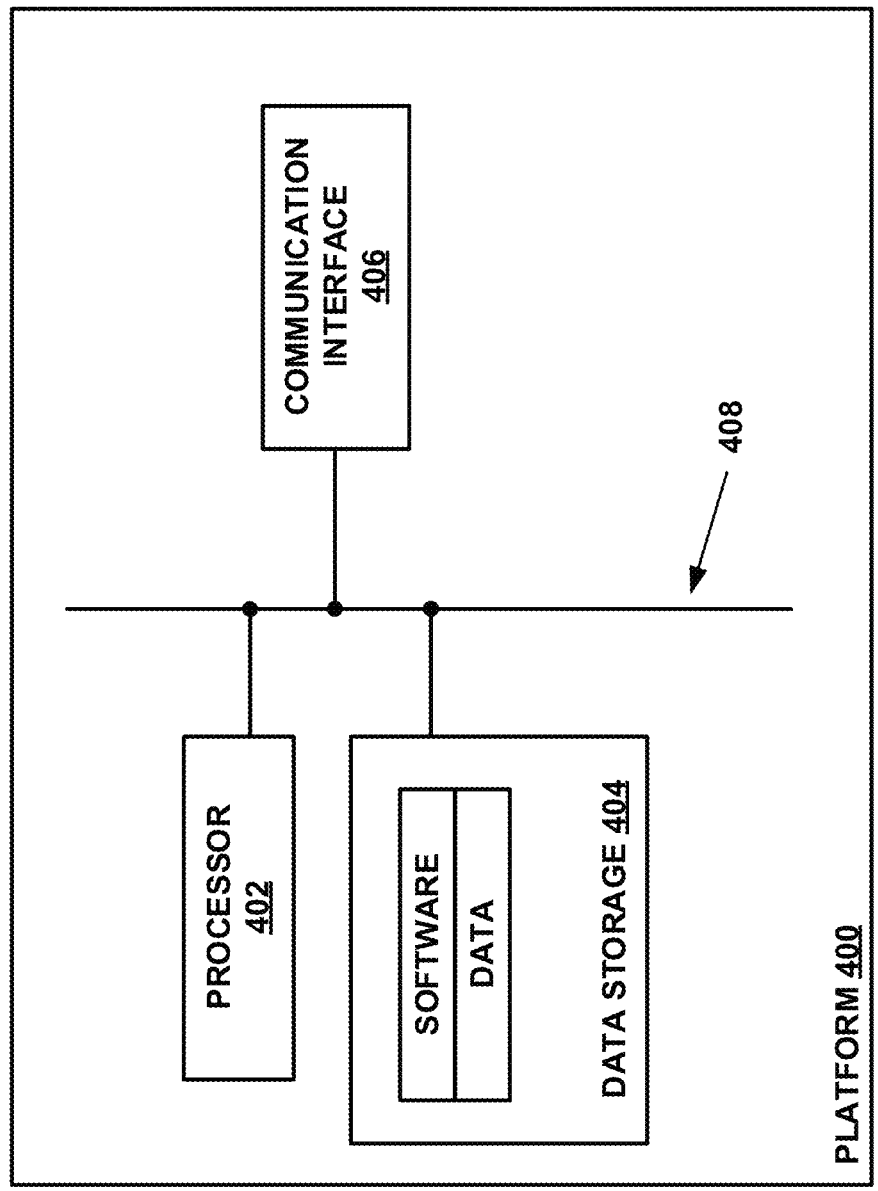
FIG. 4 depicts a simplified block diagram of an example asset data platform.

FIG. 4 is a simplified block diagram illustrating some structural components that may be included in an example computing platform 400, which could serve as asset data platform 302 in FIG. 3. In line with the discussion above, platform 400 may generally comprise one or more computer systems (e.g., one or more servers), and these one or more computer systems may collectively include at least a processor 402, data storage 404, and a communication interface 406, all of which may be communicatively linked by a communication link 408 that may take the form of a system bus, a communication network such as a public, private, or hybrid cloud, or some other connection mechanism.

Processor 402 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 402 could comprise processing components that are distributed across a plurality of physical computing devices connected via a network, such as a computing cluster of a public, private, or hybrid cloud.

In turn, data storage 404 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 404 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 4, data storage 404 may be provisioned with software components that enable the platform 400 to carry out the functions disclosed herein. These software components may generally take the form of program instructions that are executable by the processor 402 to carry out the disclosed functions, which may be arranged together into software applications, virtual machines, software development kits, toolsets, or the like.

Further, data storage 404 may be arranged to store asset-related data in one or more databases, file systems, or the like. For example, data storage 404 may be configured to store data using technologies such Apache Cassandra, Apache Hadoop, PostgreSQL, and/or MongoDB, among other possibilities. Data storage 404 may take other forms and/or store data in other manners as well.

Communication interface 406 may be configured to facilitate wireless and/or wired communication with data sources and output systems, such as data sources 104 and output systems 306 in FIG. 3. Additionally, in an implementation where platform 400 comprises a plurality of physical computing devices connected via a network, communication interface 406 may be configured to facilitate wireless and/or wired communication between these physical computing devices (e.g., between computing and storage clusters in a cloud network). As such, communication interface 406 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wireless and/or wired communication. Communication interface 406 may also include multiple communication interfaces of different types. Other configurations are possible as well.

Although not shown, platform 400 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with platform 400.

It should be understood that platform 400 is one example of a computing platform that may be used with the embodiments described herein. Numerous other arrangements are possible and contemplated herein. For instance, other computing platforms may include additional components not pictured and/or more or less of the pictured components.

Figure 5:
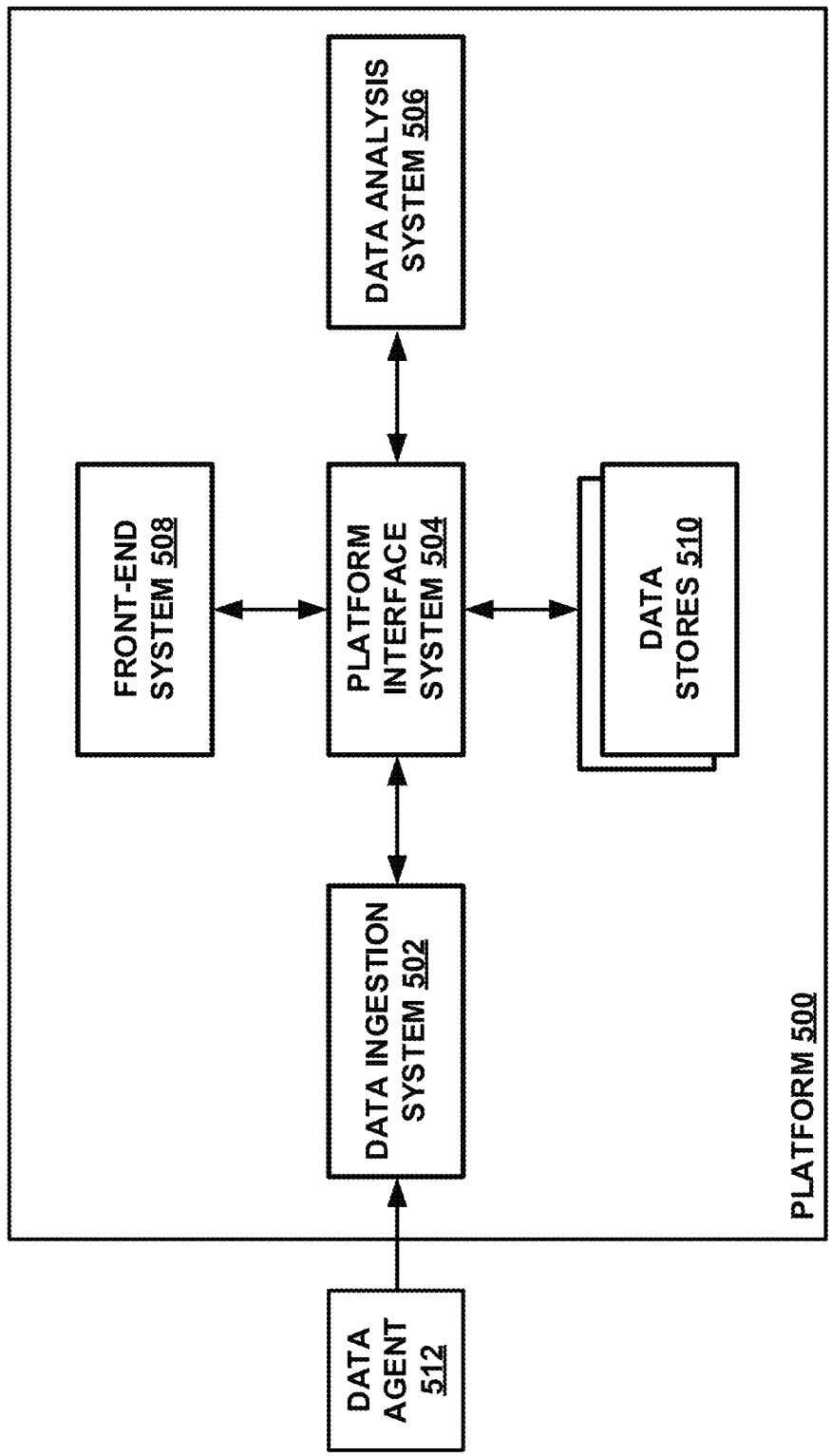
FIG. 5 depicts an example asset data platform from a functional perspective.

Referring now to FIG. 5, another simplified block diagram is provided to illustrate some functional systems that may be included in an example platform 500. For instance, as shown, the example platform 500 may include a data ingestion system 502, a platform interface system 504, a data analysis system 506, a front-end system 508, and one or more data stores 510, each of which comprises a combination of software and hardware that is configured to carry out particular functions. In line with the discussion above, these functional systems may be implemented on one or more computing systems, which may take the form of computing infrastructure of a public, private, and/or hybrid cloud or one or more dedicated servers, among other possibilities.

At a high level, data ingestion system 502 may be configured to ingest asset-related data received from the platform's one or more data sources, transform the ingested data into a standardized structure, and then pass the ingested data to platform interface system 504. In this respect, the function of ingesting received data may be referred to as the "extraction" (or "acquisition") stage within data ingestion system 502, the function of transforming the ingested data into a desired structure may be referred to as the "transformation" stage within data ingestion system 502, and the function of passing the ingested data to platform interface system 504 may be referred to as the "load" stage within data ingestion system 502. (Alternatively, these functions may collectively be referred to as the ETL stage). In some embodiments, data ingestion system 502 may also be configured to enhance the ingested data before passing it to platform interface system 504. This function of enhancing the ingested data may be referred to as the "enhancement" stage within data ingestion system 502. However, data ingestion system 502 may take various other forms and perform various other functions as well.

At the extraction stage, data ingestion system 502 may be configured to receive and ingest various types of asset-related data from various types of data sources, including but not limited to the types of asset-related data and data sources 304 discussed above with reference to FIG. 3. Further, in line with the discussion above, data ingestion system 502 may be configured to receive asset-related data from a data source in various manners. For instance, one possibility, data ingestion system 502 may be configured to receive batch transmissions of asset-related data from a data source. As another possibility, data ingestion system 502 may be configured to receive asset-related data from a data source in a streaming fashion. As yet another possibility, data ingestion system 502 may be configured to receive asset-related data from a data source in response to sending a request for such data to the data source, in which case data ingestion system 502 may be configured to periodically send requests for asset-related data to the data source. As still another possibility, data ingestion system 502 may receive asset-related data from a data source by subscribing to a service provided by the data source (e.g., via an API or the like). And as still another possibility, the data ingestion system 502 may be configured to receive asset-related data by way of a manual input or manual upload of such data. In this respect, for instance, the platform 500 may provide through front-end system 508 or through other means an interface through which a user could manually enter asset-related data or could provide an electronic file (e.g., a Microsoft Excel file) containing asset-related data. Data ingestion system 502 may be configured to receive asset-related data from a data source in other manners as well.

Before data ingestion system 502 receives asset-related data from certain data sources, there may also be some configuration that needs to take place at such data sources. For example, a data source may be configured to output the particular set of asset-related data that is of interest to platform 500. To assist with this process, the data source may be provisioned with a data agent 512, which generally comprises a software component that functions to access asset-related data at the given data source, place the data in the appropriate format, and then facilitate the transmission of that data to platform 500 for receipt by data ingestion system 502. In other cases, however, the data sources may be capable of accessing, formatting, and transmitting asset-related data to platform 500 without the assistance of a data agent.

Turning to the transformation phase, data ingestion system 502 may generally be configured to map and transform ingested data into one or more predefined data structures, referred to as "schemas," in order to standardize the ingested data. As part of this transformation stage, data ingestion system 502 may also drop or quarantine any data that cannot be mapped to a schema.

In general, a schema is an enforceable set of rules that define the manner in which data is to be structured in a given system, such as a data platform, a data store, etc. For example, a schema may define a data structure comprising an ordered set of data fields that each have a respective field identifier (e.g., a name) and a set of parameters related to the field's value (e.g., a data type, a unit of measure, etc.). In such an example, the ingested data may be thought of as a sequence of data records, where each respective data record includes a respective snapshot of values for the defined set of fields. The purpose of a schema is to define a clear contract between systems to help maintain data quality, which indicates the degree to which data is consistent and semantically correct.

In some implementations, data ingestion system 502 may also be configured to map and transform different types of asset-related data to different schemas. For instance, if the asset-related data received from different data sources is to be input into different types of data analytics operations that have different input formats, it may be advantageous to map and transform such asset-related data received from the different data sources to different schemas.

As part of the transformation stage, data ingestion system 502 may also be configured to perform various other quality checks on the asset-related data before passing it to platform interface system 504. For example, data ingestion system 502 may assess the reliability (or "health") of certain ingested data and take certain actions based on this reliability, such as dropping any unreliable data. As another example, data ingestion system 502 may "de-dup" certain ingested data by comparing it against data that has already been received by platform 500 and then ignoring or dropping duplicative data. As yet another example, data ingestion system 502 may determine that certain ingested data is related to data already stored in the platform's data stores (e.g., a different version of the same data) and then merge the ingested data and stored data together into one data structure or record. Data ingestion system 502 may perform other types of quality checks as well.

It should also be understood that certain data ingested by data ingestion system 502 may not be transformed to a predefined schema (i.e., it is possible that certain ingested data will be "passed through" without performing any transformation on the data), in which case platform 500 may operate on this ingested data as it exists in its original data structure.

As noted above, in some embodiments, data ingestion system 502 may also include an "enhancement" stage where data ingestion system 502 enhances the ingested data before passing it to platform interface system 504. In this respect, data ingestion system 502 may enhance the ingested data in various manners. For instance, data ingestion system 502 may supplement the ingested data with additional asset-related data that is derived by and/or otherwise accessible to platform 500. Such additional data may take various forms. As one example, if the ingested data comprises sensor data, data ingestion system 502 may be configured to supplement the sensor data with "roll-up" data and/or "features" data that is derived from the sensor data. As another possible example, data ingestion system 502 may generate and append certain "enrichments" to the ingested data, examples of which are described in U.S. application Ser. No. 16/004,652, which is incorporated by reference herein in its entirety. As another possible example, data ingestion system 502 may label the ingested data with a categorical label or other canonical description in order to harmonize like data that may otherwise contain ambiguous entries. As one example of this, work order data may typically contain textual descriptions of maintenance work that has been carried out. In the event that these textual descriptions are not fully descriptive or contain ambiguous descriptions of the work that was carried out, the data ingestion system can supplement or replace these textual descriptions with a description that appropriately conveys that work that was carried out. Data ingestion system 502 may enhance the ingested data in other manners as well.

After data ingestion system 502 has performed any appropriate transformation and/or enhancement operations on the ingested data, it may pass the ingested data to platform interface system 504, which may be configured to receive data from data ingestion system 502, store the received data in one or more of data stores 510, and make the data available for consumption by the other functional systems of platform 500—including data analysis system 506 and/or front-end system 508. In this respect, the function of passing the ingested data from data ingestion system 502 to platform interface system 504 may take various forms.

According to an example implementation, data ingestion system 502 may begin by categorizing the ingested data into separate data categories (or "domains") that are to be consumed separately by the platform's other functional systems. In turn, data ingestion system 502 may publish the data within each category to a corresponding interface (e.g., an API or the like) that is provided by platform interface system 504. However, it should be understood that other approaches for passing the ingested data from data ingestion system 502 to platform interface system 504 may be used as well, including the possibility that data ingestion system 502 may simply publish the ingested data to a given interface of platform interface system 504 without any prior categorization of the ingested data.

After platform interface system 504 receives the ingested data from data ingestion system 502, platform interface system 504 may cause that data to be stored at the appropriate data stores 510 within platform 500. For instance, in the event that platform interface system 504 is configured to receive different categories of ingested data, platform interface system 504 may be configured store data from a first category into a first data store 510, store data from a second category into a second data store 510, and so on. In addition, platform interface system 504 may store an archival copy of the ingested data into an archival data store 510. Platform interface system 504 may store the ingested data in other manners as well.

After receiving the ingested data from data ingestion system 502, platform interface system 504 may also make the ingested data available for consumption by the platform's other functional systems—including data analysis system 506 and front-end system 508. In this respect, platform interface system 504 may make the ingested data available for consumption in various manners, including through the use of message queues or the like.

After consuming data from platform interface system 504, data analysis system 506 may generally function to perform data analytics operations on such data and then pass the results of those data analytics operations back to platform interface system 504. These data analytics operations performed by data analysis system 506 may take various forms.

As one possibility, data analysis system 506 may create and/or execute predictive models related to asset operation based on asset-related data received from one or more data sources, such as predictive models that are configured to predict occurrences of failures at an asset. One example of a predictive model that may be created and executed by data analysis system 506 is described in U.S. application Ser. No. 14/752,258, which is incorporated by reference herein in its entirety.

As another possibility, data analysis system 506 may create and/or execute models for detecting anomalies in asset-related data received from one or more data sources.

Some examples of anomaly detection models that may be created and executed by data analysis system 506 are described in U.S. application Ser. Nos. 15/567,012 and 15/788,622, which are incorporated by reference herein in their entirety.

As yet another possibility, data analysis system 506 may be configured to create and/or execute other types of data analytics programs based on asset-related data received from one or more data sources, examples of which include data analytics programs that evaluate asset-related data using a set of predefined rules (e.g., threshold-based rules), data analytics programs that generate predictive recommendations, data analytics programs that perform noise filtering, and data analytics programs that perform image analysis, among other possibilities.

The data analytics operations performed by data analysis system 506 may take various other forms as well.

Further, it should be understood that some of the data analytics operations discussed above may involve the use of "engineering first principles" techniques as well as machine learning techniques, examples of which may include regression, random forest, support vector machines (SVM), artificial neural networks, Naïve Bayes, decision trees, dimensionality reduction, k-nearest neighbor (kNN), gradient boosting, clustering, and association, among other possibilities. "Engineering first-principles" techniques generally refer to any form of analysis that utilizes engineering principles (e.g. knowledge of physics or chemistry, engineering standards, equipment specifications, etc.) to predict the outcome of an experiment or action. Basically, the stuff that we did for the ~200 years between the dawn of the industrial revolution and the invention of "machine learning".

As discussed above, after performing its data analytics operations, data analysis system 506 may then pass the results of those operations back to platform interface system 504, which may store the results in the appropriate data store 510 and make such results available for consumption by the platform's other functional systems—including data analysis system 506 and front-end system 508.

In turn, front-end system 508 may generally be configured to drive front-end applications that may be presented to a user via a client station (e.g., client station 106A). Such front-end applications may take various forms. For instance, as discussed above, some possible front-end applications for platform 500 may include an asset performance management application, a service optimization application, and/or an asset dealer operations application, among other possibilities.

In practice, front-end system 508 may generally function to access certain asset-related data from platform interface system 504 that is to be presented to a user as part of a front-end application and then provide such data to the client station along with associated data and/or instructions that define the visual appearance of the front-end application. Additionally, front-end system 508 may function to receive user input that is related to the front-end applications for platform 500, such as user requests and/or user data. Additionally yet, front-end system 508 may support a software development kit (SDK) or the like that allows a user to create customized front-end applications for platform 500. Additionally yet, front-end system 508 may be used to configure or "tweak" any analysis presented by the platform 500, such as by receiving user input to adjust assumptions made by data science models, correcting or enhancing the asset-related data, among other examples of configuring the analyses. Front-end system 508 may perform other functions as well.

Platform 500 may also include other functional systems that are not shown. For instance, although not shown, platform 500 may include one or more additional functional systems that are configured to output asset-related data and/or instructions for receipt by other output systems, such as third-party data platforms, assets, work-order systems, parts-ordering systems, or the like.

One of ordinary skill in the art will appreciate that the example platform shown in FIGS. 4-5 is but one example of a simplified representation of the structural components and/or functional systems that may be included in a platform, and that numerous others are also possible. For instance, other platforms may include structural components and/or functional systems not pictured and/or more or less of the pictured structural components and/or functional systems. Moreover, a given platform may include multiple, individual platforms that are operated in concert to perform the operations of the given platform. Other examples are also possible.

III. Example Asset

As discussed above with reference to FIGS. 1-3, asset data platform 302 may be configured to perform functions to facilitate the monitoring, analysis, and/or management of various types of substation assets, examples of which may include transformers, circuit breakers, switches, relays, capacitor banks, lightning arrestors, and feeder units, among other examples.

As mentioned, broadly speaking, a substation asset may generally comprise a combination of one or more electrical, mechanical, electromechanical, and/or electronic components that are designed to perform one or more tasks at a substation. Depending on the type of asset, such components may take various forms. For instance, a transformer may include a bushing, fans, windings, water pumps, coolers, and various internal electrical connections, which work together to carry out the tasks of a transformer. However, other types of assets may include other various other types of components.

Figure 6:
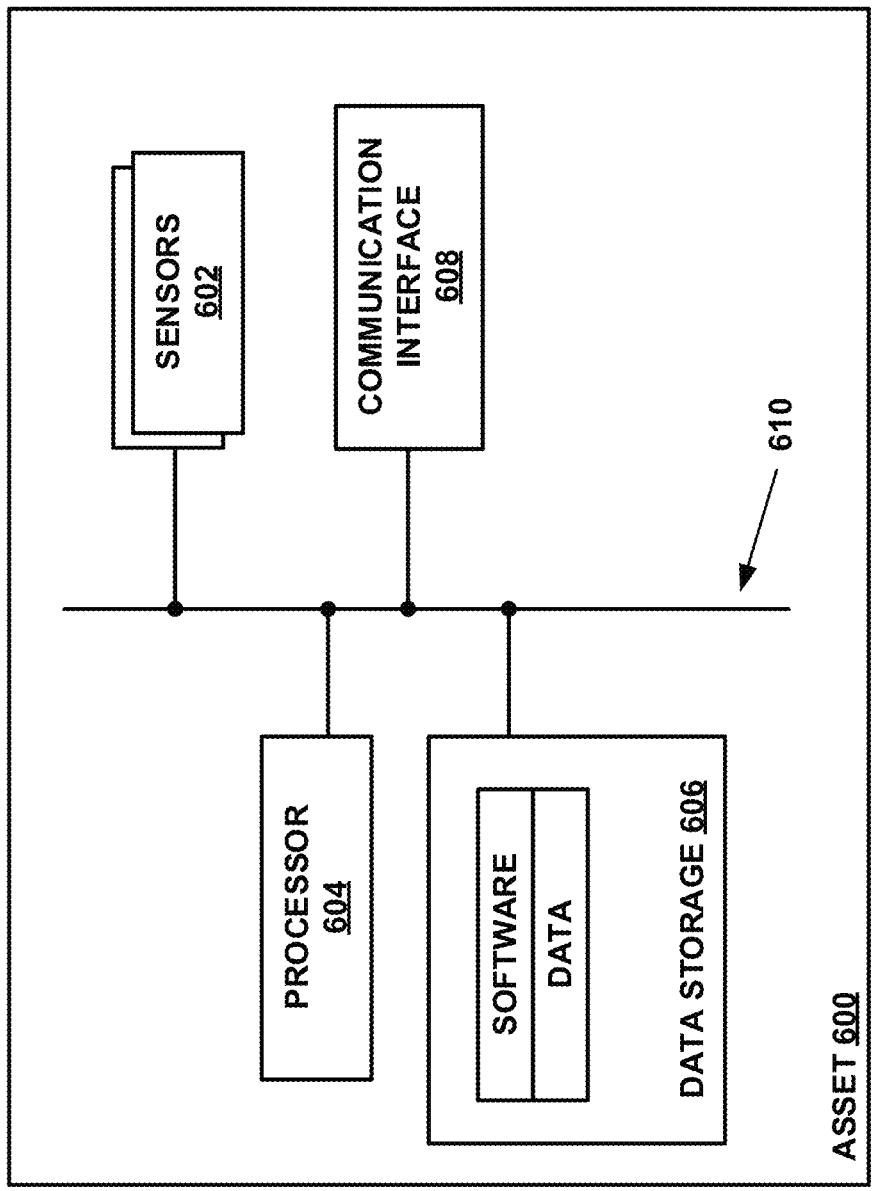
FIG. 6 depicts the on-board components of an example asset.

In addition to the aforementioned components, an asset may also be equipped with a set of on-board components that enable the asset to capture and report operating data. To illustrate, FIG. 6 is simplified block diagram showing some on-board components for capturing and reporting operating data that may be included within or otherwise affixed to an example asset 600. As shown, these on-board components may include sensors 602, a processor 604, data storage 606, a communication interface 608 all of which may be communicatively coupled by a communication link 610 that may take the form of a system bus, a network, or other connection mechanism. Although the functional blocks are shown in FIG. 6 and described with reference to an asset, it will be appreciated that the functionality represented by one or more of these blocks may be part of a single enclosure or a single device or the functionality may be distributed across multiple enclosures or multiple devices.

In general, sensors 602 may each be configured to measure the value of a respective operating parameter of asset 600 and then output data that indicates the measured value of the respective operating parameter over time. In this respect, the operating parameters of asset 600 that are measured by sensors 602 may vary depending on the type of asset, but some representative examples may include temperature, pressure, vibration, fluid level, voltage, current, magnetic field, electric field, presence or absence of objects, current position of a component, and power generation, among many others.

In practice, sensors 602 may each be configured to measure the value of a respective operating parameter continuously, periodically (e.g., based on a sampling frequency), and/or in response to some triggering event. In this respect, each sensor 602 may have a respective set of operating parameters that defines how the sensor performs its measurements, which may differ on a sensor-by-sensor basis (e.g., some sensors may sample based on a first frequency, while other sensors sample based on a second, different frequency). Similarly, sensors 602 may each be configured to output data that indicates the measured value of its respective operating parameter continuously, periodically (e.g., based on a sampling frequency), and/or in response to some triggering event.

Based on the foregoing, it will be appreciated that sensors 602 may take various different forms depending on the type of asset, the type of operating parameter being measured, etc. For instance, in some cases, a sensor 602 may take the form of a general-purpose sensing device that has been programmed to measure a particular type of operating parameter. In other cases, a sensor 602 may take the form of a special-purpose sensing device that has been specifically designed to measure a particular type of operating parameter (e.g., a temperature sensor, an oil pressure sensor, etc.). In still other cases, a sensor 602 may take the form of a special-purpose device that is not primarily designed to operate as a sensor but nevertheless has the capability to measure the value of an operating parameter as well (e.g., an actuator). Sensors 602 may take other forms as well.

Processor 604 may comprise one or more processor components, such as general-purpose processors, special-purpose processors, programmable logic devices, controllers, and/or any other processor components now known or later developed. In turn, data storage 606 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc.

As shown in FIG. 6, data storage 606 may be arranged to contain executable program instructions (i.e., software) that cause asset 600 to perform various functions related to capturing and reporting operating data, along with associated data that enables asset 600 to perform these operations. For example, data storage 606 may contain executable program instructions that cause asset 600 to obtain sensor data from sensors 602 and then transmit that sensor data to another computing system (e.g., asset data platform 302). As another example, data storage 606 may contain executable program instructions that cause asset 600 to evaluate whether the sensor data output by sensors 602 is indicative of any abnormal conditions at asset 600 (e.g., by applying logic such as threshold-based rules to the measured values output by sensors 602), and then if so, to generate abnormal-condition data that indicates occurrences of abnormal conditions. The executable program instructions and associated data stored in data storage 606 may take various other forms as well.

Communication interface 608 may be configured to facilitate wireless and/or wired communication between asset 600 and various computing systems, including an asset data platform such as asset data platform 302. As such, communication interface 608 may take any suitable form for carrying out these functions, examples of which may include a chipset and antenna adapted to facilitate wireless communication, an Ethernet interface, a serial bus interface (e.g., Firewire, USB 2.0, etc.), and/or any other interface that provides for wireless and/or wired communication. Communication interface 608 may also include multiple communication interfaces of different types. Other configurations are possible as well. It should also be understood that asset 600 may not be equipped with its own on-board communication interface.

Although not shown, asset 600 may also be equipped with hardware and/or software components that enable asset 600 to adjust its operation based on asset-related data and/or instructions that are received at asset 600 (e.g., from asset data platform 302 and/or local analytics device 610). For instance, as one possibility, asset 600 may be equipped with one or more of an actuator, motor, value, solenoid, or the like, which may be configured to alter the physical operation of asset 600 in some manner based on commands received from processor 604. In this respect, data storage 606 may additionally be provisioned with executable program instructions that cause processor 604 to generate such commands based on asset-related data and/or instructions received via communication interface 608. Asset 600 may be capable of adjusting its operation in other manners as well.

Further, although not shown, asset 600 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with the on-board components of asset 600.

One of ordinary skill in the art will appreciate that FIG. 6 merely shows one example of the components of an asset, and that numerous other examples are also possible. For instance, the components of an asset may include additional components not pictured, may have more or fewer of the pictured components, and/or the aforementioned components may be arranged and/or integrated in a different manner. For instance, although the components of asset 600 are shown together in block diagram form, it should be understood that in practice, these components may be distributed throughout a geographically wide area, such that sensor data acquisition may occur at or near the location of the asset, data storage may occur in another disparate location, and data display, processing, and monitoring may occur in yet another location.

Further, one of ordinary skill in the art will appreciate that two or more of the components of asset 600 may be integrated together in whole or in part. Further yet, one of ordinary skill in the art will appreciate that at least some of these components of asset 600 may be affixed or otherwise added to asset 600 after it has been placed into operation.

IV. Example Operations

As described above, the present disclosure is directed to new technology for determining and presenting a measure of a substation's probability of failure. As a general matter, a substation may be considered to have failed when an outage occurs at that substation, or in other words, when the substation is unable to send power to one or more of the substation's output power paths. A substation can be thought of as having one or more input power paths, from which power comes into the substation, and one or more output power paths, out of which power flows. As mentioned above, depending on the type and purpose of the substation, power coming into a substation on the input power path(s) generally arrives via a transmission system and ultimately from power generation facilities. Power flowing out of a substation generally flows to other substations via transmission lines and ultimately to the distribution network where it is fed to customers, such as homes and businesses.

A substation may be unable to send power to one or more of its output power paths (and thus the substation will be considered to have failed) when one or more individual assets within the substation fails and causes power not to flow to one or more of the substation's output power paths. As explained above, existing approaches for determining substation failure probabilities generally analyze substation failure probability on an asset-by-asset basis and then generally based solely on the age of the individual asset. For a few reasons, this tends not to accurately reflect the actual probability of the substation failing (i.e., the probability of the substation being unable to send power to one or more of its output power paths).

First, assessing the probability of failure of an individual asset based solely on the age of that asset (and not any other information about the asset's operation, maintenance, etc.) tends to be somewhat inaccurate. Similar assets in different substations that have operated under different conditions and/or have different histories of operation and/or maintenance tend to have different probabilities of failure at any given point in their operating lifetimes. For instance, one kind of transformer operating in a relatively temperate climate may tend to have a different probability of failure than a similarly-aged transformer operating in a relatively humid climate or a climate with drastic temperature swings. Likewise, circuit breakers that have differing historical patterns of operation (e.g., with one circuit breaker having operated many more times than another circuit breaker over the same time period) will have different probabilities of failure, even at similar points in their respective operating lifetimes.

Second, assessing substation failure probability by considering only the failure probabilities of the individual assets within the substation fails to account for the electrical configuration of the substation, which may impact the actual probability of an outage occurring at that substation, and thus does not yield an accurate assessment of the probability of failure of the while substation. For instance, as described above, substations tend to have multiple redundant power paths. Consider the electrical configuration of example substation 200 of FIG. 2, where the substation has a first power path 210 and a second power path 220. Given this configuration, a failure occurring along power path 210 (e.g., a failure at transformer TR1 or breaker CB1) may not necessarily result in an outage at the substation and thus may not result in what would be considered a failure of the substation. Indeed, if another power path—like power path 220—is able to compensate for the failure of an individual asset along power path 210 and supply power to all output power paths within power path 210, then the failure of an individual asset within power path 210 ought not to be considered a failure of the substation. In this example, power path 220 could supply power to the output power paths along power path 210 (e.g., the paths that are fed by feeders FDR1-3) when bus tie circuit breaker BT2 is already closed or can be immediately closed upon the failure of an asset within power path 210. This ties together 13 kV Bus 1 and 13 kV Bus 2 and thus allows power to flow from 69 kV Bus 2 to both 13 kV Bus 1 and 13 kV Bus 2. However, temporary changes to a substation's electrical configuration may affect the probability of a failure occurring at the substation. For instance, if transformer TR2 is offline for maintenance, the probability of failure of the substation may be elevated as a result of the lack of a redundant power path.

Thus, there is a need for technology that helps determine and present a more accurate measure of the probability of failure of a given substation by, for instance, taking into account the electrical configuration of the given substation as well as mote intelligently derive the failure probabilities of the individual assets at the substation.

To address these and other shortcomings with existing technology, disclosed herein is a new data-driven approach for determining and presenting a more intelligent measure of the probability of failure of a substation. The disclosed approach generally involves (i) deriving respective failure probabilities of the individual assets within the substation by taking into consideration certain operating, environmental, maintenance or other types of data related to the individual assets, (ii) determining the electrical configuration of the substation, (iii) determining a substation failure probability based on the respective failure probabilities of the individual assets within the substation and the electrical configuration of the substation, and then (iv) presenting the probability of substation failure and/or the respective failure probabilities for the individual assets to a user in various ways. Advantageously, a user may then use this probability of substation failure and/or the respective failure probabilities for the individual assets together with knowledge of the impact or consequence of a failure at the substation to make planning decisions, or the like, for the substation or the rest of the electrical system.

Figure 7:
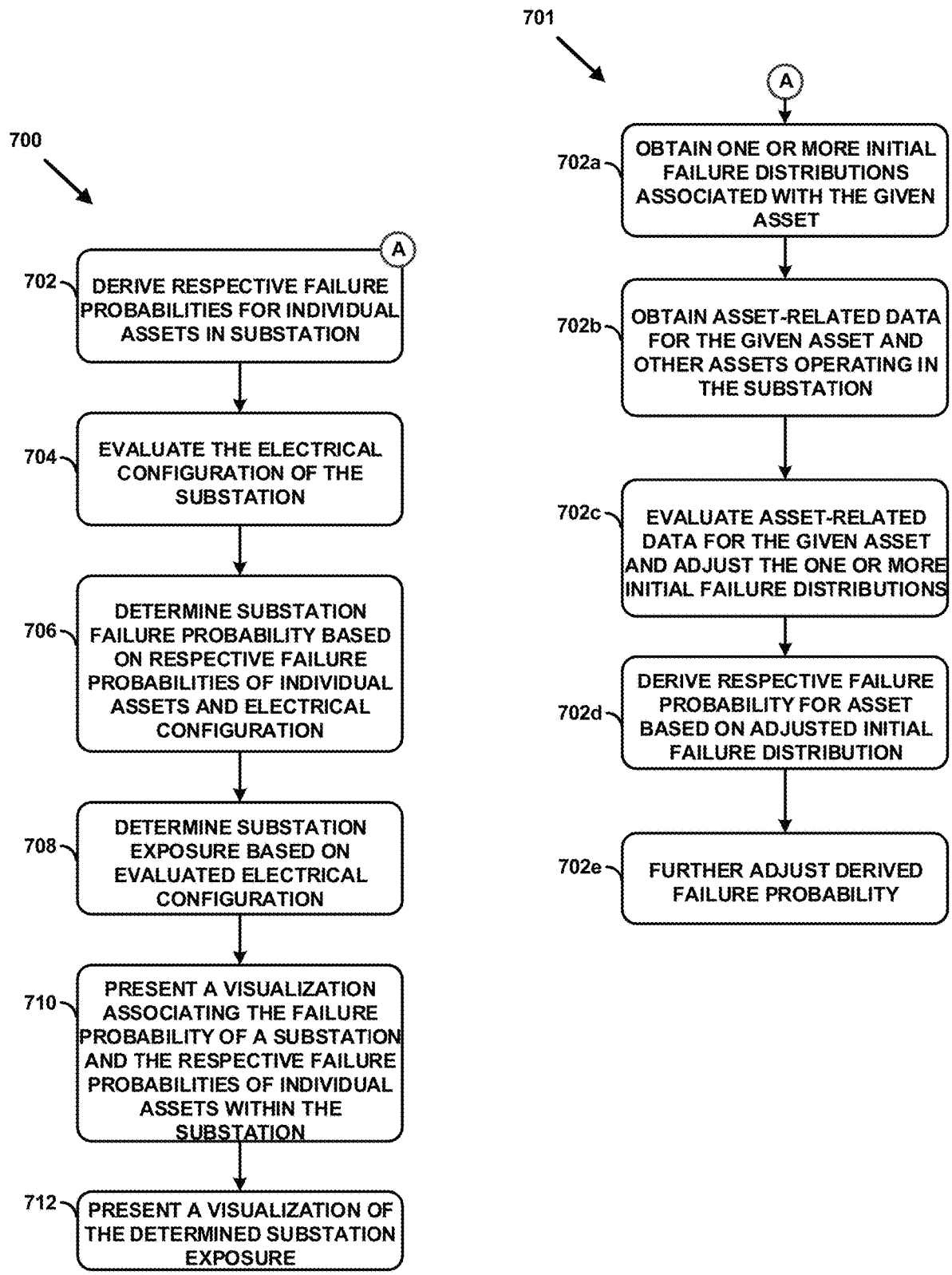
FIG. 7 is a flow diagram showing some example operations that may be included in a process for deriving the failure probability of a substation, according to an example embodiment.

To help describe this new process, FIG. 7 depicts two functional block diagrams 700 and 701 that illustrate example embodiments of the disclosed process. For the purposes of illustration, the example operations embodied by the blocks in block diagrams 700 and 701 and described further herein below are described as being carried out by asset data platform 302, but it should be understood that data analytics platforms other than asset data platform 302 may perform the example operations. Likewise, it should be understood that the disclosed process is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

As shown in FIG. 7, the disclosed process may begin at block 702 with asset data platform 302 deriving a respective failure probability for each of a plurality of individual assets in a substation. The asset data platform may do this in a number of different ways.

As one possibility, asset data platform 302 may derive a respective failure probability for a given asset based on an initial failure distribution for the given asset, which asset data platform 302 may obtain in various manners. In some cases, the asset data platform 302 may retrieve data indicative of the initial failure distribution from one of the data sources 304 (such as the maintenance data source 304C) or some other network storage location. In practice, this data indicative of the initial failure distribution may be generated by the asset manufacturer, an SME, or some other entity.

In other cases, the asset data platform 302 may first obtain data indicative of an initial "wearout" distribution for an asset or components of an asset and then use that initial wearout distribution or initial wearout distributions to derive an initial failure distribution. A wearout distribution generally refers to a data set that attempts to relate the useful life of an asset or a component of an asset as a function of the usage of the asset or asset component. In practice, assets (and the components thereof) wear out (i.e., approach the end of their useful life) as a function of the extent to which those assets and components are used. For instance, a transformer may have a standard estimate useful life of about 20 years. However, that useful life can be shortened or lengthened depending on if the transformer is utilized with heavy loads for long periods of times and whether it receives regular maintenance. If the transformer is utilized with heavy loads and not regularly maintained, then the transformer may reach the end of its useful life faster than 20 years, whereas if the transformer is utilized under light loads and is regularly maintained, the transformer may not wear out until at or near the 20 year mark. In order to derive an initial failure distribution for an asset or a component of an asset, the asset data platform may refer to historical operating data for the asset as well as the historical and future maintenance schedule for the asset or the component thereof and attempt to predict where on the wearout distribution the asset or component is. In the case that the asset data platform has a wear out distribution for each component of an asset, the asset data platform may roll these multiple wearout distributions up into an initial failure distribution for the asset that relates a probability of failure of the asset to the asset's age. The asset data platform may come to access a initial failure distribution for a given asset in any number of other ways as well.

In general, the initial failure distribution may take the form of a particular type of trend line or curve, which plots the estimated probability of failure of the asset as a function of the asset's age. One example of such an initial failure distribution is depicted by curve 802 in FIG. 8. As depicted, the initial failure distribution curve 802 indicates that for the given asset, the probability of failure is near 0% at the beginning of the asset's life and trends upward at some, perhaps variable rate until it reaches near 100%, which is considered the end of the asset's useful life. As mentioned, typically an asset manufacturer will provide or otherwise make such an initial failure distribution available to those who own such assets. Initial failure distribution curves may be different for different types of assets and may even be different for the same type of assets manufactured by different entities.

Further, the function of deriving a respective failure probability for a given asset at a substation based on an initial failure distribution for the given asset may take various forms. As one example of this, the asset data platform may refer to curve 802, locate the position on curve 802 that corresponds to the age of the given asset, and identify the intersection of curve 802 with the age of the asset along the x-axis of the graph. As depicted, this may result in deriving a respective failure probability of, say, 40% for this given asset, although other examples are possible.

As another possibility, asset data platform 302 may derive a respective failure probability for a given asset in a substation using a more data-driven approach that is based on both the initial failure distribution curve for the given asset and also other data related to the given asset (and perhaps also other assets at the substation). Such a data-driven approach for deriving a respective failure probability for a given asset in a substation may take various forms.

To help illustrate one example of how the asset data platform may engage in this approach, reference is now made to functional block diagram 701. Starting first at block 702a, the asset data platform 302 may obtain one or more initial failure distributions associated with a given asset. The one or more initial failure distributions could be a single, asset-level initial failure distribution, such as described above with respect to block 702, which may reflect an estimated probability of failure of the asset as a function of the asset's age. Or, the one or more initial failure distributions could be a plurality of component-level initial failure distributions, that are each associated with a different possible failure mechanism associated with the given asset. Each such component-level initial failure distribution may reflect an estimated failure probability of a respective component of the asset as a function of the respective component's age. For instance, a given asset may have one or more components or other respective points of failure, each of which may be referred to as a respective failure mechanism. On transformer assets, for instance, one failure mechanism may relate to pump equipment operating within the transformer, whereas another failure mechanism may relate to a motor or motors operating within the transformer, whereas yet another failure mechanism may relate to a valve or valves positioned within the transformer, the failure of any one of which would cause the entire transformer asset to fail. In this respect, and in accordance with this example transformer asset, the one or more initial failure distributions obtained by the platform may include a failure distribution for the pump equipment, a failure distribution for the motor(s), and/or a failure distribution for the valve(s), although failure distributions for other components on a given asset may be possible as well.

On circuit breaker assets, for instance, one failure mechanism may relate to a relay mechanism operating within the transformer, whereas another failure mechanism may relate to an injector mechanism operating within the transformer, where again the failure of any one of which would cause the entire circuit breaker asset to fail. In this respect, and in accordance with this example circuit breaker asset, the one or more initial failure distributions obtained by the platform may include a failure distribution for the relay mechanism, and/or a failure distribution for the injector mechanism. Again, other failure mechanisms for transformer and circuit breaker assets may be possible as may other failure mechanisms for other assets.

Asset data platform 302 may, for instance, obtain the one or more initial failure distributions in any of the same ways as described above with respect to block 702. For instance, the asset data platform 302 may retrieve data indicative of the one or more initial failure distributions from one of the data sources 304 (such as the maintenance data source 304C) or some other network storage location. In practice, this data indicative of the one or more initial failure distributions may be generated by the asset manufacturer, the manufacturer of the component to which a respective component-level failure distribution relates, an SME, or some other entity. The asset data platform may come to access one or more initial failure distributions associated with a given asset in any number of other ways as well.

At block 702b, the asset data platform may next obtain asset-related data for the given asset and perhaps the other assets operating in the substation. Generally, asset-related data may include any of various types of data available to asset data platform 302, such as the types of operating data received at asset data platform 302 from data sources 304, among other possibilities. For instance, asset-related data may include (i) one or more operating data variables received from asset 304A, such as one or more sensor data variables collected by a sensor of an asset, or one or more abnormal-conditions data variables, among other possible data variables collected by an asset; (ii) one or more operating data variables received from operating data source 304B; (iii) one or more maintenance data variables received from asset maintenance data source 304C; (iv) one or more environmental data variables received from environmental data source 304D; (v) one or more user input data variables received from client station 304E; and/or (vi) one or more derived data variables that are derived based on the forgoing data variables, such as roll-up data variables and/or features data variables.

At a more specific level, but still by way of example, the asset-related data may include (i) data that indicates type of the individual asset (e.g., brand, make, model, etc.); (ii) data that indicates the age of the individual asset; (iii) data that indicates the past and/or current operating state of the individual asset itself, such as sensor data, work-order data, etc.; (iv) data that represents encoded knowledge of subject matter experts (SMEs) regarding the failure probability for various types of assets and/or various failure mechanisms associated with a given asset in various different circumstances, which may be referred to as "SME data"; and (v) data that indicates the past and/or current operating state of other assets that are included within the power substation, such as sensor data, work-order data, etc. for the other substation assets, which may serve to provide relevant context for the operational state of the individual asset itself. Other types of asset-related data may be possible as well.

At block 702c, the asset data platform may evaluate the asset-related data obtained for the given asset in order to determine whether and to what extent to adjust the one or more initial failure distributions associated with the given asset, which results in one or more adjusted failure distributions. In embodiments in which the asset data platform obtains a single, asset-level initial failure distribution, the platform may evaluate the asset-related data obtained for the given asset and determine to adjust the single, asset-level initial failure distribution in some way based on the asset-related data. In embodiments in which the asset data platform obtains a plurality of component-level initial failure distributions that are each associated with a different possible failure mechanism associated with the given asset, the platform may evaluate the asset-related data obtained for the given asset and determine to adjust one or more of the plurality of component-level initial failure distributions, perhaps even adjusting these failure distributions in different ways, based on the asset-related data.

The asset data platform may evaluate the asset-related data obtained for the given asset in order to determine whether and to what extent to adjust the one or more initial failure distributions associated with the given asset in a variety of ways. As one possibility, the asset data platform 302 may interpret the asset-related data using certain SME data to evaluate the asset-related data and, based on this evaluation, determine whether and to what extent to adjust the derived initial failure probability for the given asset. In this respect, interpreting the asset-related data using certain SME data may include, for instance, referring to the SME data, and determining whether the SME data indicates that an adjustment to one or more of the initial failure distributions is warranted in light of the asset-related data. In one embodiment of this procedure, the SME data may be embodied as a set of encoded rules, such that the platform may refer to the encoded rules and determine whether the rules indicate that an adjustment to the one or more of the initial failure distributions is warranted. For instance, one type of asset-related data that may be considered when determining whether and to what extent to adjust the one or more initial failure distribution parameters is asset-related data that represents how often an asset was operated (e.g., how often a circuit breaker was opened under load) and what the historical electrical load has been on the asset. Parameters like these contribute to the stress and aging of the asset, with assets having been operated more frequently and assets operating under heavy load experiencing faster aging and increased failure probabilities as compared to assets that may not have been frequently operated or operated under heavy load. Other ways to interpret the asset-related data using SME data may be possible as well.

As another possibility, the asset data platform 302 may evaluate the asset-related data by passing the asset-related data as inputs to one or more data science models, such as an anomaly detection model, which may be executed by data analysis system 506. In this respect, an anomaly detection model may be configured to evaluate the extent to which portions of the asset-related data is or has historically been anomalous. An anomaly detection model may be configured to engage in such an evaluation in a variety of ways. In one example configuration, the anomaly detection model may be configured to evaluate whether and to what extent certain asset-related data for the given asset has historically been anomalous compared with other portions of the asset-related data for the given asset. For instance, in this type of configuration, the anomaly detection model may engage in the evaluation and determine that a given transformer has during some periods (perhaps during summer months) operated with oil temperatures that are anomalous compared to oil temperatures with which the same transformer operated during other periods (perhaps during winter months). In another example configuration, the anomaly detection model may be configured to evaluate whether and to what extent certain asset-related data for the given asset has historically been anomalous compared with asset-related data collected for other assets for the same time. For instance, in this type of configuration, the anomaly detection model may engage in the evaluation and determine that a given transformer has during some periods operated with an oil temperature that is anomalous compared to oil temperatures of other similar types of transformers operating elsewhere throughout the power system. Other configurations of anomaly detection models may be possible as well.

In any case, if the evaluation of the asset-related data obtained for the given asset indicates that an adjustment to one or more of the initial failure distributions is warranted (e.g., based on the evaluation of the asset-related data in the context of SME data, using an anomaly detection model, or some other evaluation), the asset data platform may accordingly make such an adjustment or adjustments.

Proceeding next to block 702d, the platform may then derive a respective failure probability for the given asset based on the adjusted one or more of the initial failure distributions associated with the given asset. The platform may do this in a variety of ways depending on the embodiment. As one example, in embodiments in which the asset data platform obtains a single, asset-level initial failure distribution, the platform may derive a respective failure probability by referring to the single, asset-level initial failure distribution and locating the position on the distribution that corresponds to the age of the given asset. As another example, in embodiments in which the asset data platform obtains a plurality of component-level initial failure distributions that are each associated with a different possible failure mechanism associated with the given asset, the platform may derive a respective failure probability for the given asset by referring to the plurality of component-level initial failure distributions and locating the respective positions on the distributions that correspond to the respective ages of the components associated with the given asset. These respective positions on the distributions may correspond to respective component-level failure probabilities, which the platform may then roll up into a derived failure probability for the given asset.

The platform may roll up the various component-level failure probabilities into a derived failure probability for the given asset in various ways. As one possibility, the platform may take the largest component-level failure probability and use that as the derived failure probability for the given asset. As another possibility, the platform may average or otherwise aggregate the component-level failure probabilities to derive an aggregated asset-level failure probability. For instance, the platform may aggregate the component-level failure probabilities by using the component-level failure probabilities to derive the probability of any one or more failures occurring at failure mechanisms associated with the given asset. As one example of this, if three component-level failure probabilities are 0.15, 0.21, and 0.36, respectively, then the platform may aggregate these failure probabilities to derive the probability of any one or more of these failures occurring by taking 1−[(1−0.15)*(1p31 0.21)*(1−0.36)] which yields 0.57. Other ways to derive asset-level failure probabilities may be possible as well.

At this point, the asset data platform 302 may conclude the process for deriving the respective failure probability for the given asset, or the asset data platform 302 may proceed to block 702e to consider additional data and determine whether a further adjustment to the derived failure probability is possible.

For instance, proceeding to block 702e, the asset data platform may evaluate any relationship between the asset-related data obtained for the given asset and asset-related data obtained for other assets in the same substation as the given asset and determine whether and to what extent to further adjust the derived failure probability for the given asset based on this relationship. In this way, the asset data platform 302 may consider an additional context in which the given asset has been operating in order to derive a more accurate measure of the probability of failure of the given asset.

In particular, the asset data platform 302 may evaluate the relationship between the asset-related data obtained for the given asset and asset-related data obtained for other assets in the same substation in a variety of ways. As one possibility, the asset data platform 302 may interpret the asset-related data obtained for the given asset and the other assets using certain SME data to evaluate the asset-related data obtained for the given asset and the other assets and, based on this evaluation, determine whether and to what extent to adjust the derived initial failure probability for the given asset. In this respect, and similar to above, interpreting the asset-related data using certain SME data may include, for instance, referring to the SME data, and determining whether the SME data indicates that an adjustment to the initial failure probability is warranted in light of the asset-related data obtained for the given asset and the other assets. As above, in one embodiment of this procedure, the SME data may be embodied as a set of encoded rules, such that the platform may refer to the encoded rules and determine whether the rules indicate that an adjustment to the initial failure probability is warranted. Other ways to interpret the asset-related data using SME data may be possible as well.

As another possibility, also similar to above, the asset data platform 302 may evaluate the asset-related data obtained for the given asset and the other assets by passing this data as inputs to one or more data science models, such as an anomaly detection model, which may be executed by data analysis system 506. In this respect, an anomaly detection model may be configured to evaluate the extent to which portions of the asset-related data obtained for the given asset and the other assets is or has historically been anomalous. An anomaly detection model may be configured to engage in such an evaluation in a variety of ways, similar to above. In one example configuration, the anomaly detection model may be configured to evaluate whether and to what extent certain asset-related data obtained for the given asset and the other assets has historically been anomalous compared with other portions of the asset-related data obtained for the given asset and the other assets. For instance, in this type of configuration, the anomaly detection model may engage in the evaluation and determine that a set of transformers in the substation has during some periods (perhaps during summers) operated with oil temperatures that are anomalous compared to oil temperatures with which the same set of transformers operated during other periods (perhaps during winters). In another example configuration, the anomaly detection model may be configured to evaluate whether and to what extent certain asset-related data obtained for the given asset and the other assets has historically been anomalous compared with asset-related data collected for other assets at other substations. For instance, in this type of configuration, the anomaly detection model may engage in the evaluation and determine that a set of transformers at the substation has during some periods operated with an oil temperature that is anomalous compared to oil temperatures of other sets of transformers at other substations elsewhere throughout the power system. Other configurations of anomaly detection models may be possible as well. If the evaluation of the relationship between the asset-related data obtained for the given asset and the other assets indicates that an additional adjustment to the initial failure probability is warranted, the asset data platform 302 may accordingly make such an adjustment.

Figure 8:
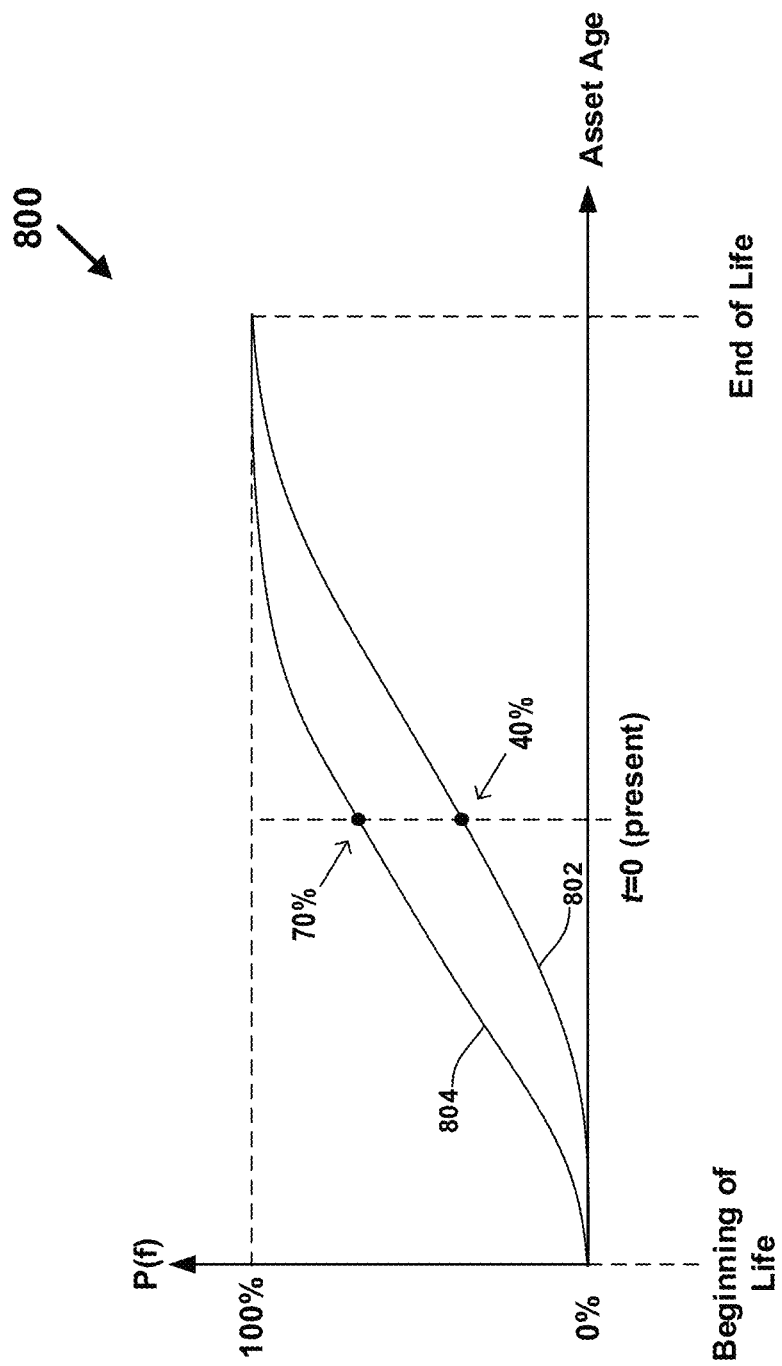
FIG. 8 depicts example failure distribution curves that may be used to derive the failure probability of an individual asset, according to an example embodiment.

To help illustrate an example adjustment of an initial failure probability, FIG. 8 depicts a curve 802 and an adjusted curve 804. As mentioned, curve 802 may represent an initial failure distribution. Curve 804 may represent an adjusted failure distribution. For instance, at time t=0, the asset data platform may engage in the foregoing process and determine that the initial failure distribution (represented by curve 802) should be adjusted to reflect curve 804. Thus, where the failure probability of a given asset based on the initial failure distribution (represented by curve 802) may have yielded a failure probability of 40%, the failure probability of the given asset based on the adjusted failure distribution (represented by curve 804) may yield a failure probability of 70%. Other ways of adjusting the initial failure distribution for the given asset based on the evaluation of asset-related data may be possible as may other ways of deriving the respective failure probabilities for individual assets in a substation.

Referring back to block diagram 700, the asset data platform may repeat the process outlined above for each asset located at a particular substation. Once the asset data platform derives respective failure probabilities for individual assets at a substation, the process may proceed to block 704 where the asset data platform may evaluate the electrical configuration of the substation. The asset data platform 302 may evaluate the electrical configuration of the substation by (i) first determining how many redundant power paths are available to feed the output power paths of the substation, and (ii) second determining on which power paths the substation's assets lie.

To help illustrate one example of this, reference is made again to substation 200 in FIG. 2. When evaluating the electrical configuration of the substation depicted in FIG. 2, 2, asset data platform may first determine that there are two redundant power paths 210 and 220. For instance, power may flow to the outputs feed by feeders FDR1-6 via either power path 210, which includes power coming into the substation on Tsmn Ln 1 and flowing via 69 kV Bus 1 through transformer TR1 and circuit breaker CB1, or power path 220, which includes power coming into the substation on Tsmn Ln 2 and flowing via 69 kV Bus 2 through transformer TR2 and circuit breaker CB2. It should be noted that this evaluation assumes that bus tie BT2 is closed (or is open but can be automatically closed while energized), which thus ties together 13 kV Bus 1 and 13 kV Bus 2 allowing power to flow to all outputs fed by feeders FDR1-6 via either power path 210 or 220. Asset data platform may next determine which power path the transformer assets and circuit breaker assets lie by, for instance, tracing the power paths and, for each, determining which assets fall along the power path. Other ways to evaluate the electrical configuration of the substation are possible as well.

Next at block 706, the asset data platform 302 may determine the substation failure probability based on the respective derived failure probabilities of the individual assets of the substation and the electrical configuration of the substation. In one respect, the asset data platform may accomplish this by aggregating the respective failure probabilities of the individual assets of the substation by deriving, for each redundant power path, the probability of a failure occurring along that power path, and then deriving the probability that a failure occurs on all of the power paths. For any power paths containing a single asset, the probability of a failure occurring along that power path may be the probability of failure of that asset. On the other hand, for any power paths that contain two or more assets, the probability of a failure occurring along that power path may be the series combination of the failure probabilities of the two or more assets in the power path.

Figure 9A:
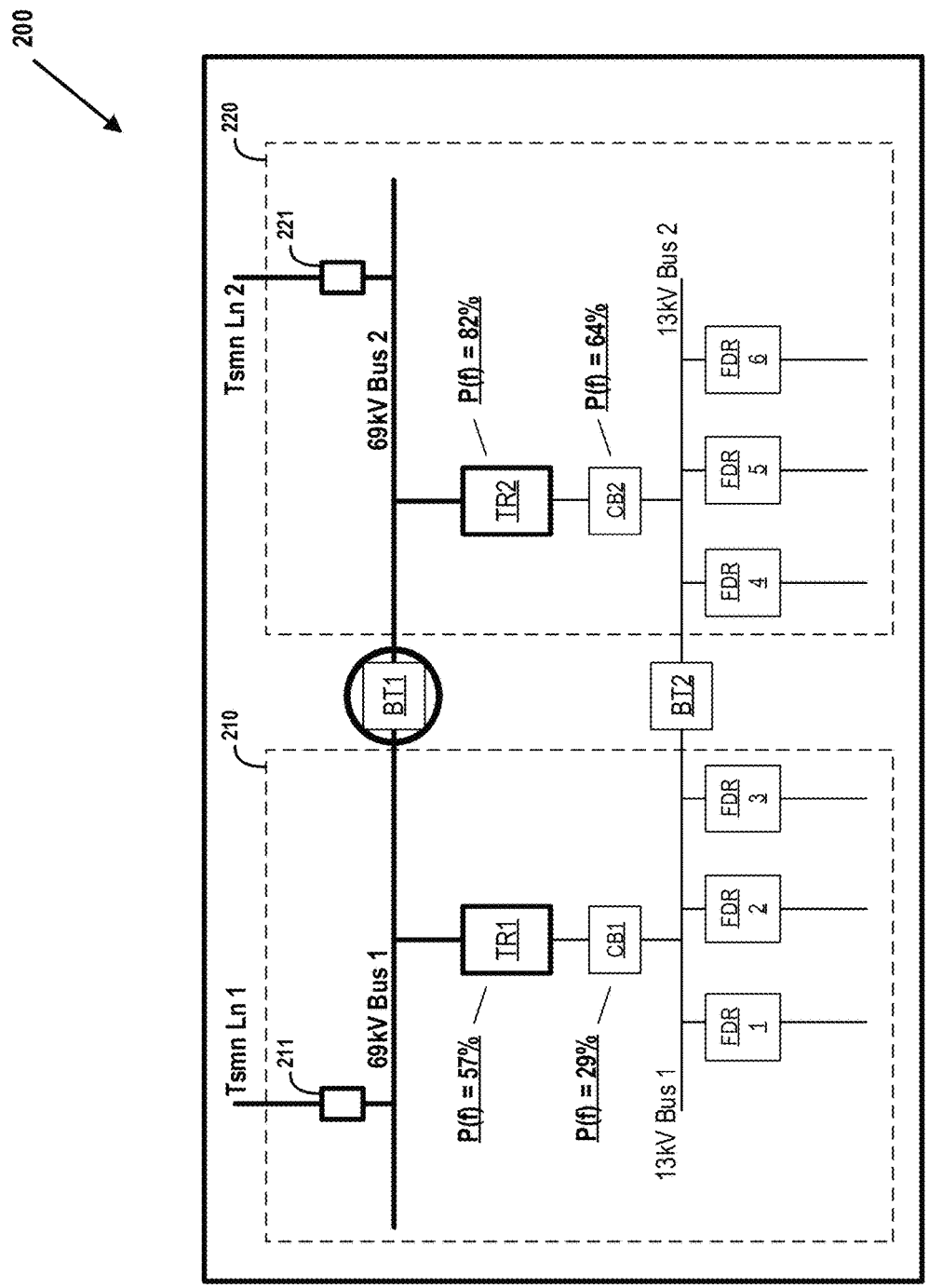
FIG. 9A depicts a simplified block diagram of an example electric power substation with example failure probabilities for individual assets.
Figure 9B:
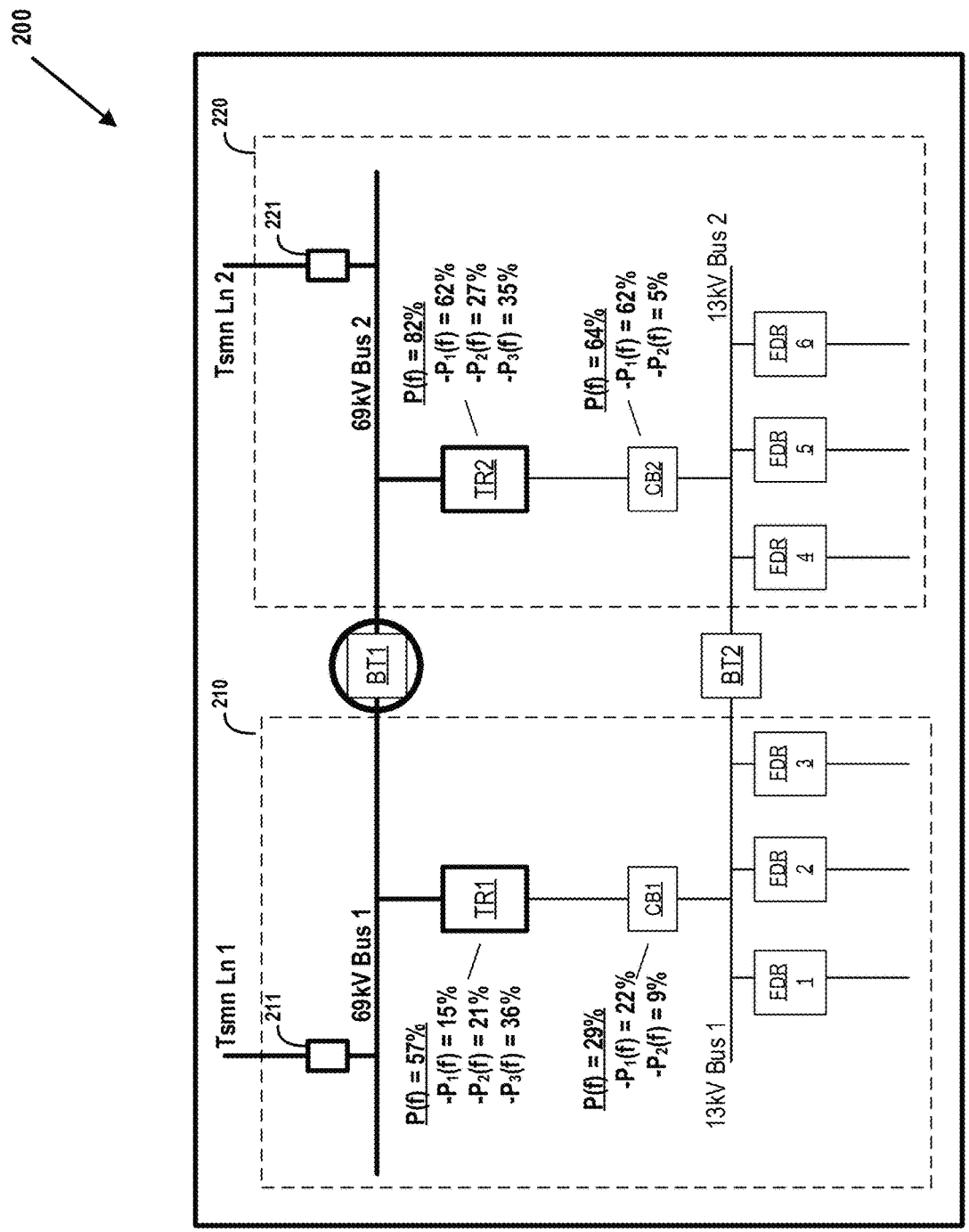
FIG. 9B depicts a simplified block diagram of an example electric power substation with example failure probabilities for individual assets and components associated with individual assets.
Figure 10:
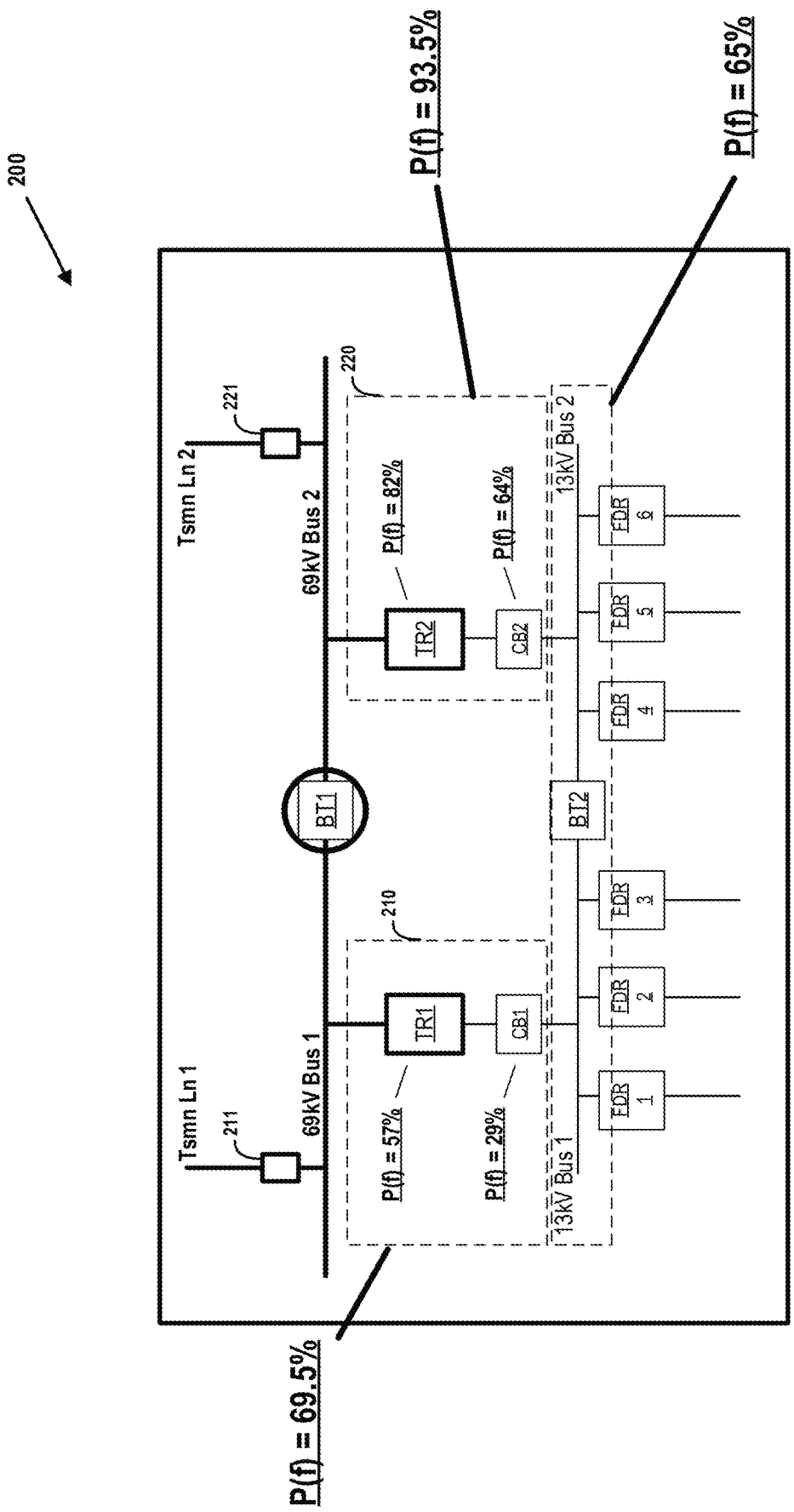
FIG. 10 depicts a simplified block diagram of an example electric power substation with aggregated failure probabilities indicated.

To help illustrate one example of the asset data platform aggregating the respective failure probabilities of the individual assets of the substation, reference is made again to substation schematic 200, depicted in FIGS. 9A, 9B, and 10, where FIG. 9A depicts an embodiment in which the platform may derive asset-level failure probabilities, and FIG. 9B depicts an embodiment in which the platform may derive component-level failure probabilities associated with possible failure mechanisms associated with the given assets and then derive asset-level failure probabilities based on these respective component-level failure probabilities.

As depicted in FIGS. 9A and 9B, asset data platform 302 may have already derived the failure probabilities of the individual assets at the substation. For example, as depicted, the platform 302 may have derived a probability of failure of transformer TR1 to be 0.57; circuit breaker CB1, 0.29; transformer TR2, 0.82; and circuit breaker CB2, 0.464. As further depicted in FIG. 9B, for instance, these asset-level probabilities may be based on respective component-level probabilities. For instance, associated with transformer TR1 may be component-level probabilities of 0.15, 0.21, and 0.36, and associated with transformer TR2 may be component-level probabilities of 0.62, 0.27, and 0.35. For each transformer, these three component-level failure probabilities may respectively correspond to failure probabilities associated with pump equipment, motors, and valves associated with the transformers, among other possible examples. Likewise, associated with transformer CB1 may be component-level probabilities of 0.22 and 0.09, and associated with circuit breaker CB2 may be component-level probabilities of 0.62 and 0.05. For each circuit breaker, these two component-level failure probabilities may respectively correspond to failure probabilities associated with relay mechanism and injector mechanism associated with the circuit breakers, among other possible examples. As also depicted, the platform may have rolled-up these respective component-level failure probabilities into respective asset-level failure probabilities as well.

Turning next to the platform deriving the probability of any failure occurring along each power path, the platform may first derive the probability of any failure occurring along power path 210. The platform may consider any single failure occurring along power path 210 to result in a failure of the entire power path. Accordingly, each of the following scenarios would result in a failure of the entire power path: (i) a failure at transformer TR1 but no failure at circuit breaker CB1, (ii) a failure at circuit breaker CB1 but no failure at transformer TR1, (iii) or a failure at both transformer TR1 and circuit breaker CB1.

For the avoidance of doubt, the probability of a failure at transformer TR1 is, as depicted, 0.57; the probability of a failure at circuit breaker CB1 is, as depicted, 0.29; the probability of no failure at transformer TR1 is 1−0.57, or 0.43; and the probability of no failure at circuit breaker CB1 is 1−0.29 or 0.71. Thus, asset data platform may derive the probability of: (i) a failure at transformer TR1 but no failure at circuit breaker CB1 by multiplying 0.57 by (1−0.29), which yields 0.40; (ii) a failure at circuit breaker CB1 but no failure at transformer TR1 by multiplying 0.29 by (1−0.57), which yields 0.125; and (iii) a failure at both transformer TR1 and circuit breaker CB1 by multiplying 0.57 by 0.29, which yields 0.165. Asset data platform may derive the probability of any failure occurring along power path 210 by adding together the probabilities of each of these scenarios, which yields 0.695.

As an alternative way to derive the probability of any failure occurring along the power path, the asset data platform may first determine the probability that no asset fails along the power path. To do this, asset data platform 302 may multiply the probability of no failure occurring at transformer TR1 (which is 1−0.57 or 0.43) by the probability of no failure occurring at circuit breaker CB1 (which is 1−0.29 or 0.71), which yields 0.305. Thus, the probability of no failure occurring along power path 210 being 0.305, the probability of any failure occurring along power path 210 can be determined by asset data platform 302 by subtracting 0.305 from 1, yielding 0.695.

Moving now to the other redundant power path 220, as depicted asset data platform 302 may have already determined that the failure probabilities of transformer TR2 is 0.82 and circuit breaker CB2 is 0.64. In accordance with the procedure outlined above, the asset data platform may derive the probability of any failure occurring along power path 220 by subtracting from 300% the probability of no failure occurring transformer TR2 (which is 1−0.82 or 0.18) and no failure occurring at circuit breaker CB2 (which is 1−0.64 or 0.36 By doing this, asset data platform may determine the probability of any failure occurring along power path 220 to be 0.18 multiplied by 0.36 and then subtracted from 1, which yields 0.935.

Asset data platform 302 may then derive the probability that a failure occurs on every power path. To do this, asset data platform 302 may multiply together the derived probabilities of failure of each power path to, in this example, arrive at 0.695 multiplied by 0.935 or 0.65. In other words, in the context of the example substation depicted in FIG. 10, the asset data platform has derived an aggregate probability of 0.65 that a failure occurs along both redundant power paths and thus no power reaches the substation outputs. Accordingly, the asset data platform considers the probability of failure of this substation to be 0.65.

In some implementations, the platform may use the probability of substation failure to determine a categorical representation of the probability of substation failure. As one example of this, the platform may determine a categorical representation of the probability of failure of the given substation to be "low," "medium," or "high" based on the derived numerical probability of failure of the given substation. In this respect, the platform may determine that the categorical representation of the probability of failure of a given substation is "low" when the probability of failure of the given substation is determined to be between 0.0 and 0.1; "medium" when the probability of failure of the given substation is determined to be between 0.1 and 0.33; and "high" when the probability of failure of the given substation is determined to be between 0.33 and 1.0, although other ranges and other categorical representations of the probability of substation failure are possible as well.

Returning to FIG. 7, the asset data platform 302 may next determine substation exposure based on the evaluation of the electrical configuration. A substation's "exposure" may be a separate measure from the probability of failure of a substation, where this measure indicates how "exposed" the substation's current electrical configuration is to failure. Herein, and in practice, this measure may at times be referred to as "electrical configuration exposure." In this respect, this measure may be categorical representation of the number of redundant power paths in the substation that are currently active, where an electrical configuration having multiple, redundant power paths that are active generally correlates to a lower electrical configuration exposure (which may be categorized as "low" or "medium" exposure) and an electrical configuration having only a single power path that is active generally correlates to a higher electrical configuration exposure (which may be categorized as a "high" exposure).

Further, the electrical configuration exposure for a substation may also be derived based on other information related to the substation's electrical configuration, such as the current configuration of any power paths within the substation. For instance, if a substation has only a single active power path but at least one other inactive power path of the substation has a configuration that allows it to be activated relatively quickly if needed, such a substation may be deemed to have a "medium" level of electrical configuration exposure. On the other hand, if a substation has only a single active power path and no other inactive power path of the substation has a configuration that allows that inactive power path to be activated relatively quickly, such a substation may be deemed to have a "high" level of electrical configuration exposure. The electrical configuration exposure levels of "low," "medium," and "high" are merely examples and other electrical configuration exposure levels may be possible as well.

Figure 11A:
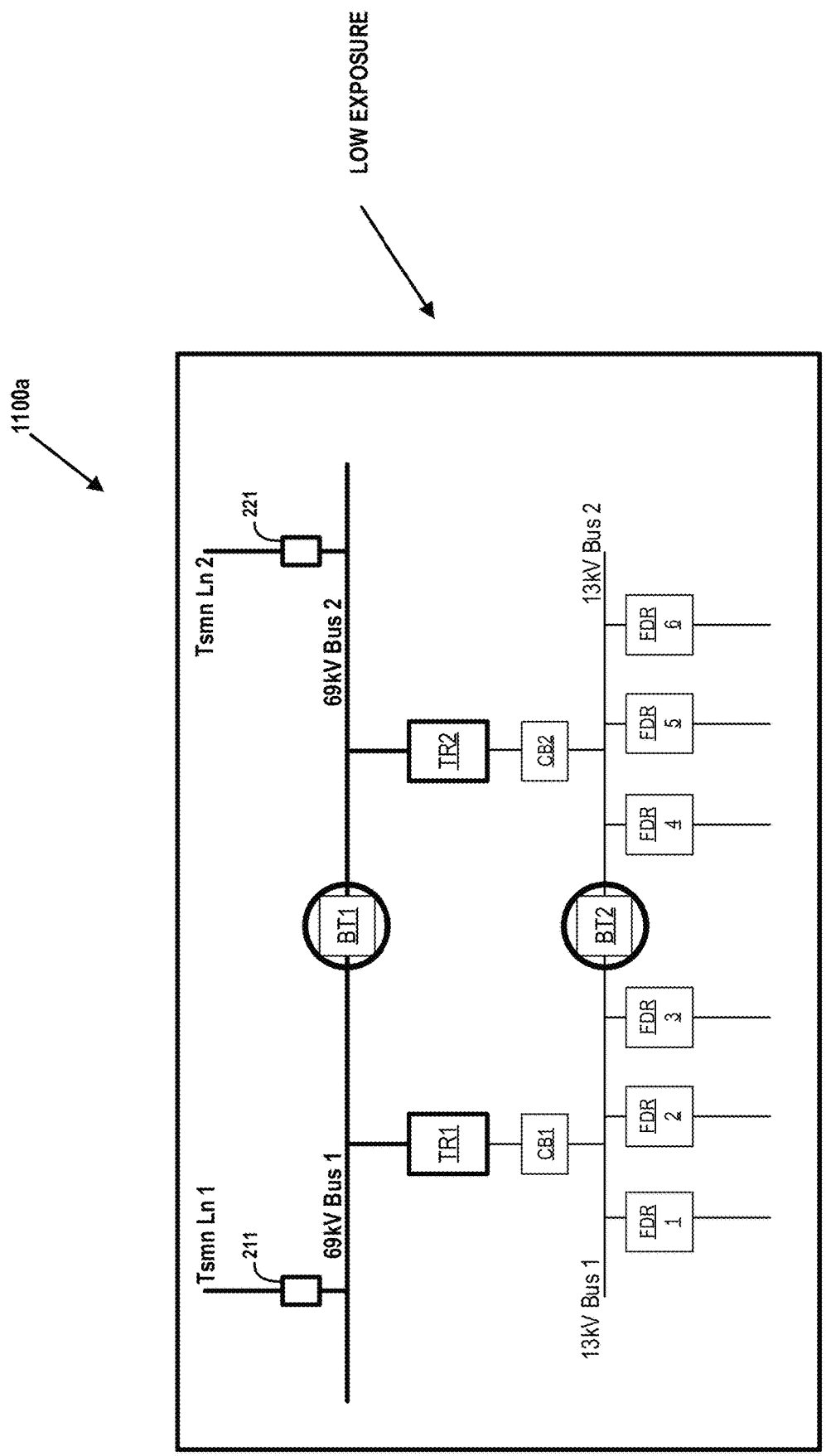
FIG. 11A depicts a simplified block diagram of an example electric power substation that may be classified as having low electrical configuration exposure according to embodiments of the present disclosure.
Figure 11B:
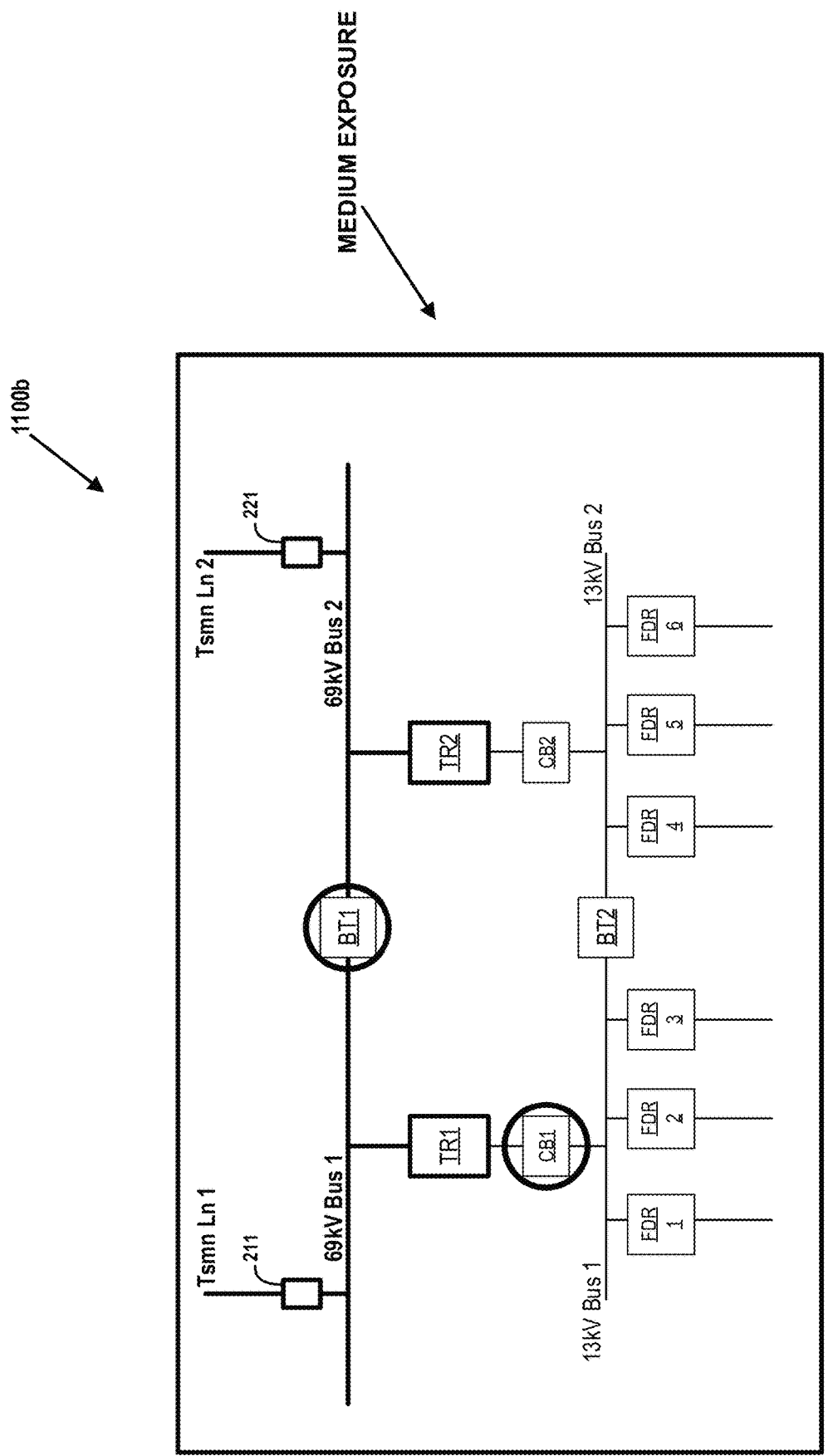
FIG. 11B depicts a simplified block diagram of an example electric power substation that may be classified as having medium electrical configuration exposure according to embodiments of the present disclosure.
Figure 11C:
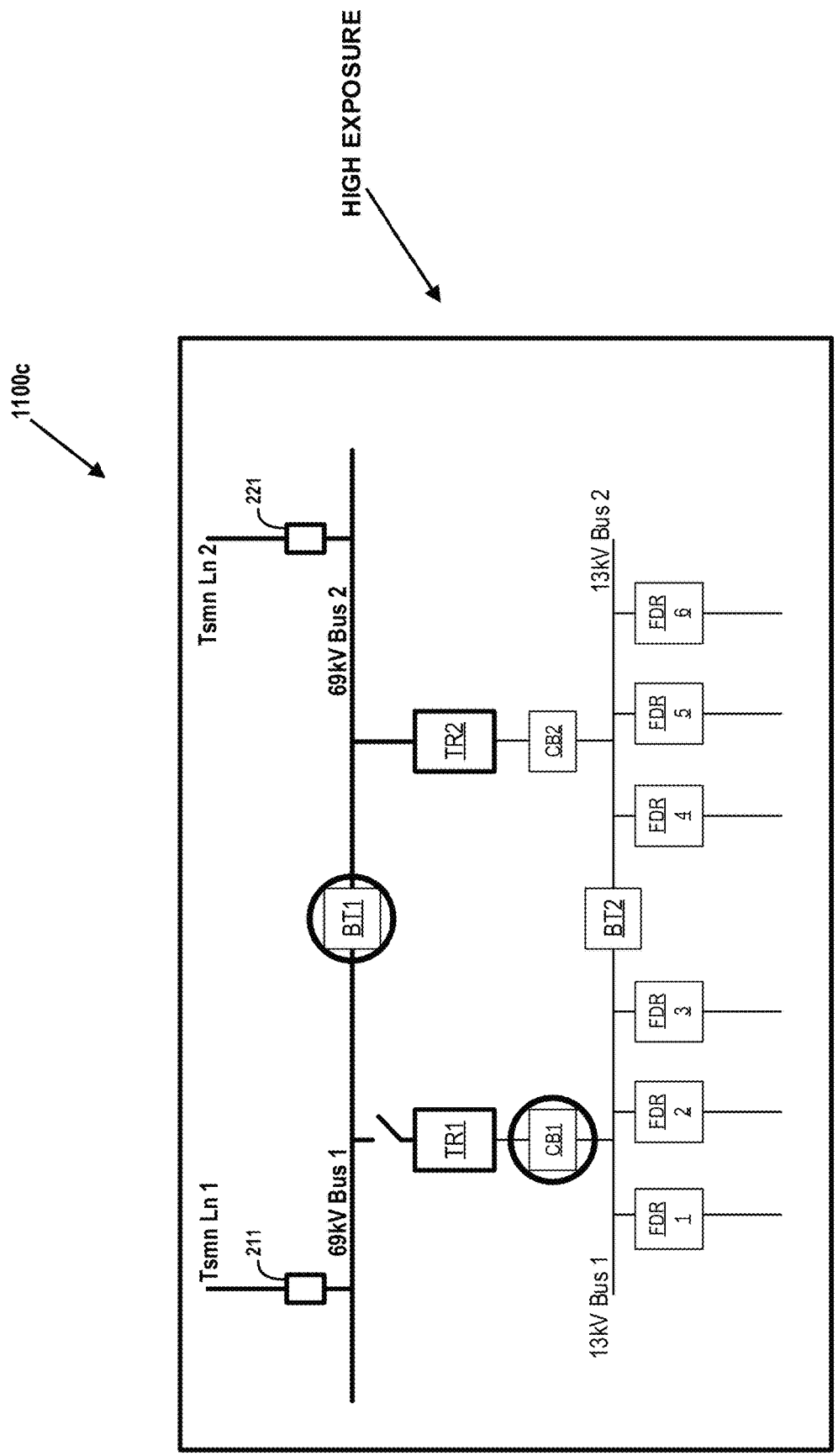
FIG. 11C depicts a simplified block diagram of an example electric power substation that may be classified as having high electrical configuration exposure according to embodiments of the present disclosure.

To help illustrate various examples of electrical configurations that the asset data platform may determine as being "low," "medium," or "high" exposure, FIGS. 11A, 11B, and 11C depict examples of substation schematics 1100a, 1100b, and 1100c, respectively, having different electrical configurations. Turning first to substation schematic 1100a in FIG. 11A, as depicted in this substation schematic, the asset data platform 302 may evaluate the electrical configuration of this substation by tracing the various electric power paths and determining that there are two active power paths: (1) a path through Tsmn Ln 1, 69 kV Bus 1, through transformer TR1, circuit breaker CB1 onto 13 kV Bus 1 and on to the substation outputs fed by feeders FDR1-3, and (2) a path through Tsmn Ln 2, 69 kV Bus 2, through transformer TR2, circuit breaker CB2 onto 13 kV Bus 2 and on to the substation outputs fed by feeders FDR4-6. As depicted, 13 kV Bus 1 and 13 kV Bus 2 are coupled by a bus-tie circuit breaker BT2. Although this bust-tie circuit breaker is presently depicted as being open, and thus not tying together 13 kV Bus 1 and 13 kV Bus 2, this bus-tie circuit breaker generally can, in the event of a fault upstream (e.g., a failure with transfer TR1, circuit breaker CB1, transformer TR2, or circuit breaker CB2), operate to close and tie together 13 kV Bus 1 and 13 kV Bus 2. As such, asset data platform 302 may consider this substation to have two redundant power paths, any one of which can, in the event of a failure on one of the power paths, service all outputs of the substation. Accordingly, the asset data platform 302 may, based on this evaluation of substation 1100a's electrical configuration, classify this substation as having a "low" electrical configuration exposure as a result of having multiple active redundant power paths.

Turning next to substation schematic 1100b in FIG. 11B, as depicted in this substation schematic, the asset data platform 302 may also evaluate the electrical configuration of this substation by tracing the various electric power paths and may determine that circuit breaker CB1 is open, which prevents power from flowing through Tsmn Ln 1, 69 kV Bus 1, through transformer TR1, circuit breaker CB1 and onto 13 kV Bus 1. Thus, asset data platform 302 may determine that there is only one active power path: a path through Tsmn Ln 2, 69 kV Bus 2, through transformer TR2, circuit breaker CB2 onto 13 kV Bus 2 and 13 kV Bus 1 via bus-tie circuit breaker BT2 and finally on to the substation outputs fed by feeders FDR1-6.

Depending on whether circuit breaker CB1 is in good working order, the asset data platform may classify this substation as either "medium" exposure or "high" exposure. If the circuit breaker CB1 is in good working order, then asset data platform 302 may expect that in the event of a fault in the other power path (i.e., the power path containing transformer TR2, circuit breaker CB2, or bus-tie circuit breaker BT2), circuit breaker CB1 could operate and close relatively immediately to thus allow power to flow from 69 kV Bus 1 through transformer TR1 and circuit breaker CB1 onto 13 kV Bus 1 and 13 kV Bus 2 to feed the substation outputs fed by feeders FDR1-6. In this case, the asset data platform may classify this substation has having a "medium" exposure as a result of having one active power path and an alternative power path that can be activated relatively quickly to compensate in the event of a failure.

Alternatively, if circuit breaker CB1 is not in good working order (i.e., it has recently operated due to a failure at the circuit breaker, or the like), then asset data platform 302 may not expect that in the event of a fault in the other power path (i.e., the power path containing transformer TR2, circuit breaker CB2, or bus-tie circuit breaker BT2), circuit breaker CB1 to operate and close relatively immediately to thus allow power to flow from 69 kV Bus 1 through transformer TR1 and circuit breaker CB1 onto 13 kV Bus 1 and 13 kV Bus 2. In this case, the asset data platform may classify this substation has having a "high" exposure as a result of having only one active power path with no alternative power path to compensate in the event of a failure.

Turning finally to substation schematic 1100c in FIG. 11C, as depicted in this substation schematic, the asset data platform 302 may also evaluate the electrical configuration of this substation by tracing the various electric power paths and may determine that circuit breaker CB1 is open, as was the case with substation 1100b, above, which prevents power from flowing through Tsmn Ln 1, 69 kV Bus 1, through transformer TR1, circuit breaker CB1 and onto 13 kV Bus 1. Thus, asset data platform 302 may determine that there is only one active power path: a path through Tsmn Ln 2, 69 kV Bus 2, through transformer TR2, circuit breaker CB2 onto 13 kV Bus 2 and 13 kV Bus 1 via bus-tie circuit breaker BT2 and finally on to the substation outputs fed by feeders FDR1-6. Asset data platform 302 may also determine that the high-side switch coupling transformer TR1 to 69 kV Bus 1 is open, meaning that transformer TR1 is not currently energized. Most operating regulations do not permit a switch like to be closed automatically or under load. In such a scenario, circuit breaker CB1 will generally not be permitted to automatically operate in the event of a fault in the other power path (i.e., the power path containing transformer TR2, circuit breaker CB2, or bus-tie circuit breaker BT2). Rather, operating regulations generally dictate that transformer TR1's high-side switch be manually closed prior to putting transformer TR1 back into service. Accordingly, asset data platform 302 may classify this substation has having a "high" exposure as a result of having one active power path and no alternative power path to compensate in the event of a failure. Asset data platform may classify substations in other manners as well.

Referring back to block diagram 700 in FIG. 7, the asset data platform 302 may perform the functions described above with respect to blocks 702 (including blocks 702a-e), 704, 706, and 708 for each of various different power stations in a power grid. Thus, for each of several substations throughout a power grid, the asset data platform may have derived a corresponding probability of failure of the substation and respective failure probabilities for the individual assets located at each substation. Additionally, asset data platform may, for each of several substations throughout a power grid, determine the substation's electrical configuration exposure level.

With this information, asset data platform may then present one or more different types of visualizations related to the operating state (sometimes referred to herein as "health") of the substations. In accordance with one example type of visualization, at block 710, the asset data platform 302 may present a visualization that associates a particular substation with at least (i) a corresponding derived probability of failure of that substation, (ii) respective failure probabilities of individual assets located at that substation and/or respective failure probabilities of individual components associated with the individual assets located at the substation, and/or (iii) a categorical representation of the probability of substation failure. In accordance with another example type of visualization, at block 712, the asset data platform may present a visualization that associates a particular substation with an indication of the electrical configuration exposure of that substation, and perhaps other metrics and other information about that substation. Other example types of visualizations may present yet additional information as well. It should be understood that, as described herein, the function of presenting a visualization includes, in some embodiments, sending, providing, or otherwise making available a set of instructions that operate to cause a client station to display the visualization.

Consistent with one example visualization, the platform may function to present a user with a view of different power substations of interest (e.g., a list view, a map view, etc.) that includes a probability of failure of the substation, which may be derived in the manner discussed above. As another example, the platform may function to present a user with a view of individual assets within a given power station (e.g., a list view, a view of the substation's domain data model, etc.) that shows the probability of failure for each such individual asset. As yet another example, if the probability of failure of a substation is unacceptably high, the platform may suggest certain maintenance actions for an asset at that substation in order to bring the probability of failure of the substation down to an acceptable level. Other examples are possible as well. In this way, the platform may indicate the probability of failure of a substation to an individual responsible for managing substations, which may help the individual make better-informed decisions when developing a maintenance plan for such substations.

Figure 12A:
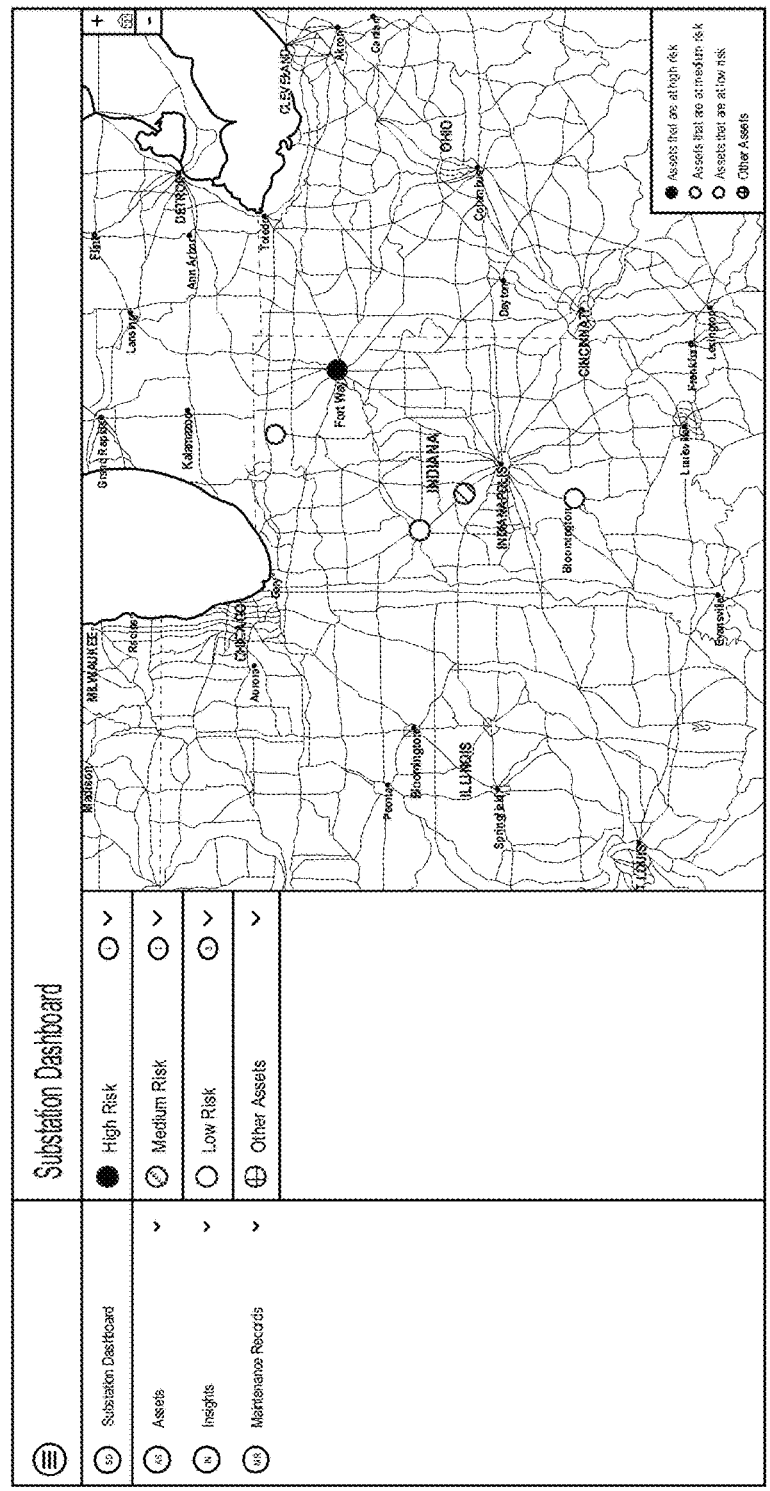
FIG. 12A is a snapshot of an example GUI depicting a visualization of the geographic locations of certain substations in a power transmission system and indications of substation rolled-up by electrical configuration exposure levels, according to an example embodiment.

The visualizations that may be presented by asset data platform 302 may take various forms. To help illustrate various ways an asset data platform may present visualizations, FIGS. 12A, 12B, 12C, 12D, 13, 14, 15, and 16 depict snapshots 1200, 1210, 1220, 1230, 1300, 1400, 1500, and 1600 respectively of visualizations that may be presented by asset data platform 302. Turning first to FIG. 12A, snapshot 1200 depicts a visualization that includes a substation dashboard. Within the substation dashboard, the visualization may include a navigable map of the territory within which the substations of the power grid are located. Depicted on this navigable map may be indications of the geographic locations of individual substations. In one embodiment, the indications may take the form of large dots, however other shapes are possible as well. Further, the indications of the substations presented on the navigable map may indicate one or more aspects of the substations. For instance, in one embodiment, the indications may have a color corresponding to the electrical configuration exposure determined, for instance, by the asset data platform 302 for that substation at block 708 (e.g., with red representing a "high" exposure, orange representing "medium" exposure, and green representing "low" exposure). Other colors and other shapes of indications are possible as well.

As also depicted in snapshot 1200, the visualization may include a categorical list of substations, rolled up according to the electrical configuration exposure determined, for instance, by the asset data platform 302 at block 706. The list may indicate the various names of the electrical configuration exposure levels (e, g., "High Risk," "Medium Risk," "and "Low Risk") and, adjacent to these names, respective numbers indicating how many substations currently in view on the navigable map have been classified with each type of electrical configuration exposure. By way of example, on the navigable map presented in snapshot 1200, there is one substation currently classified as "High Risk," one substation currently classified as "Medium Risk," and three substations currently classified as "Low Risk," although in other example more or fewer substations may be classified with these, or other types of electrical configuration exposure levels.

Figure 13:
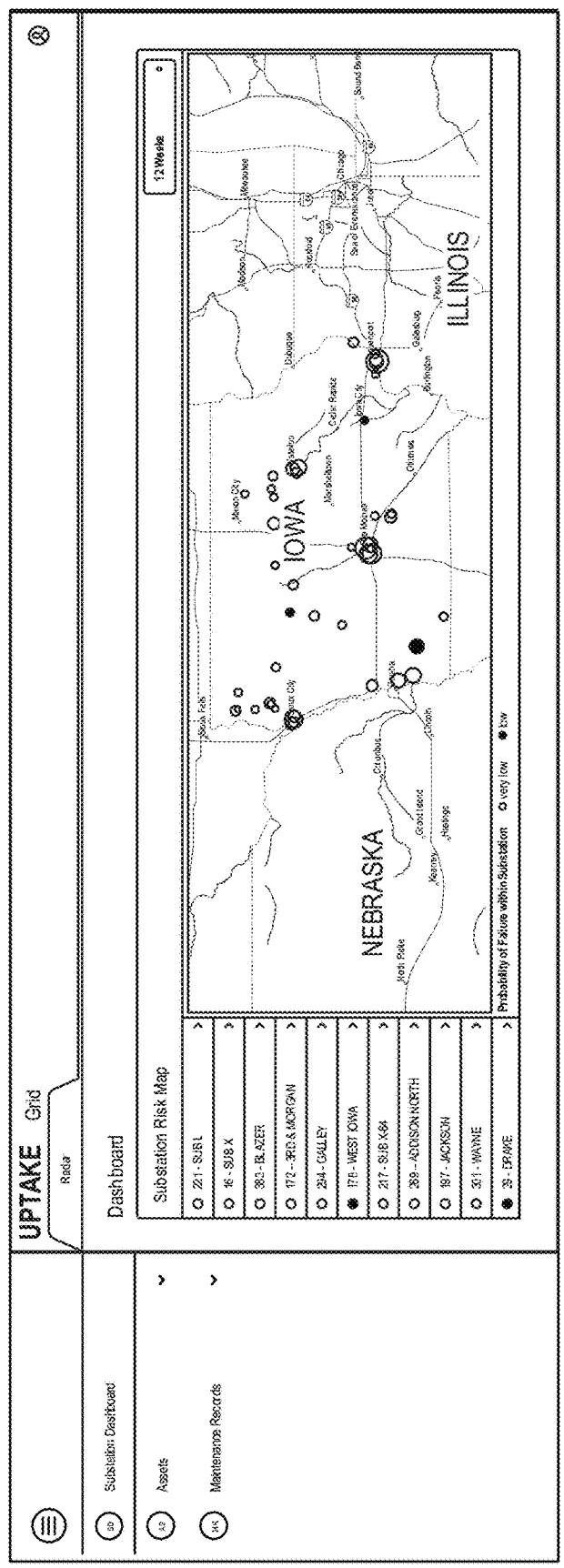
FIG. 13 is a snapshot of an example GUI depicting a visualization of an example electric power substation risk map.

An alternative way to present a substation dashboard is depicted in FIG. 13. Snapshot 1300 of FIG. 13 depicts a visualization that includes a navigable map of the territory within which the substations of the power grid are located. As depicted, each substation is represented by a dot of varying size and color. In this embodiment, the color of a given substation's dot may correspond to the probability of failure occurring within that substation, (e.g., with red representing a probability of failure ranging between 100% and 60%, orange representing a failure ranging between 60% and 25%, and green representing a probability of failure ranging between 25% and 0%, as examples). In this embodiment, the size of the dot may represent the number of customers that are currently serviced by the given substation. Also depicted in snapshot 1300 is a list of the substations of the power grid sorted by probability of failure, with substations having a higher probability of failure appearing at the top of the list. In other embodiments, the size and color of dots representing the various substations of the power grid may represent other features and/or aspects of the substations.

Figure 14:
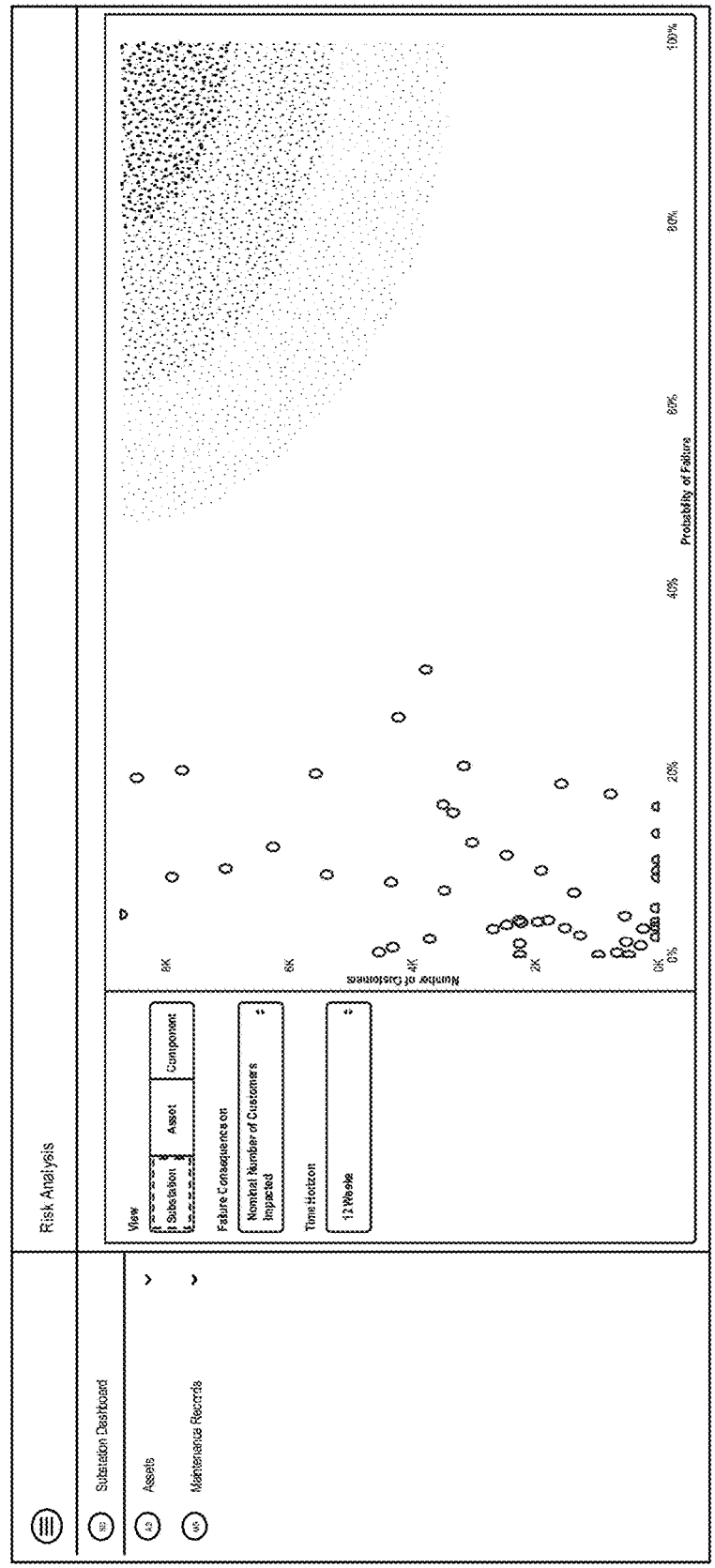
FIG. 14 is a snapshot of an example GUI depicting a visualization of an example electric power substation probability of failure graph.

Yet another alternative way to present a substation dashboard is depicted in FIG. 14. Snapshot 1400 of FIG. 14 depicts a visualization in which the substations of a power grid are represented in graphical form. In this embodiment, each respective point has a color that is representative of the probability of a failure occurring at that substation relative to the probabilities of failures occurring at the other substations. For instance, to obtain such a list, the platform may rank the substations in order of their respective failure probabilities, with substations having higher failure probabilities appearing at the top of the list. Then for the top 20% of substations (i.e., the 20% of substations that have the highest failure probabilities) the platform may represent these substations with red points on visualization 1400. For the next 20%, the platform may represent these substations with orange points on visualization 1400. For the next 20%, the platform may represent these substations with yellow points on visualization 1400. For the next 20%, the platform may represent these substations with light green points on visualization 1400. And for the bottom 20%, the platform may represent these substations with dark green points on visualization 1400. The platform may position a given point along the y-axis of visualization 1400 in accordance with the number of customers that are currently served by the given substation represented by the given point. And the platform may position a given point along the x-axis of visualization 1400 in accordance with the actual numerical probability of failure of the given substation represented by the given point. In some embodiments, the asset data platform may provide an ability for the user to change what the x-axis or y-axis of the graph represents. In one example, the visualization includes dropdown boxes within which a user may select one or more options for each axis. Other ways to represent substations of a power grid in graphical form may be possible as well.

In some implementations, asset data platform 302 may enable a user to drill-down on the electrical configuration exposure levels to see which substations have been classified under which levels and what the failure probabilities are for these substations. Asset data platform 302 may also enable a user to drill-down on individual substations by presenting the various probabilities of failure of the individual assets within the substation as well as perhaps other data relevant to the substation.

Figure 12B:
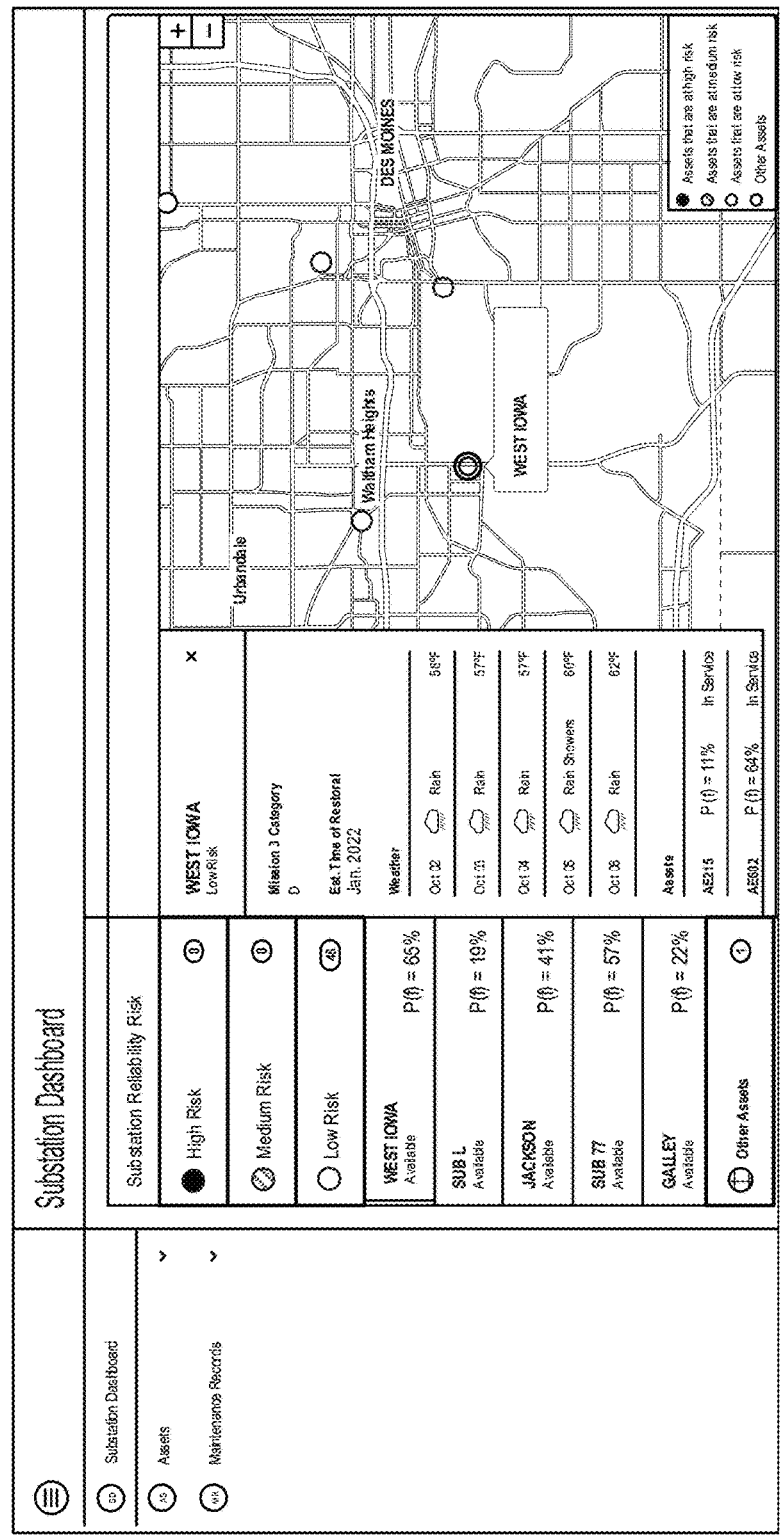
FIG. 12B is a snapshot of an example GUI depicting a visualization of certain substations in a power transmission system along with derived probabilities of failure, according to an example embodiment.

For instance, returning to FIG. 12A, to drill-down on one of the electrical configuration exposure levels, asset data platform may enable a user to click or otherwise select one of the depicted electrical configuration exposure levels. The asset data platform 302 may, when receiving an indication that a user has clicked or otherwise selected one of the electrical configuration exposure levels, display a list of the substations that have been classified with that level of electrical configuration exposure. FIG. 12B depicts a snapshot 1210 that displays a list of substations underneath the "Low Risk" classification. Along with the name of each substation, asset data platform may present an indication of a failure probability of that substation, which may have been determined in accordance with the steps described above with respect to block diagrams 700 and 701. The platform may present the indication of the failure probability of the substation in numerical form (e.g., 0.65 or 65%) and/or categorical form (e.g., with a label "High" and/or a corresponding color, such as red). Other indications of the failure probability of a substation are possible as well.

Asset data platform 302 may also enable a user to click or otherwise select one of the listed substations in order to present additional information relevant to that substation. As depicted, for instance, the West Iowa substation has been selected, which may cause the asset data platform to display an information panel to the right of the substation list. The information panel may include information such as the weather forecast at the substation's location, a list of the assets that make up the substation, and perhaps an indication of the failure probabilities of these individual assets, although many other types of information may also be depicted, depending on the embodiment.

Figure 12C:
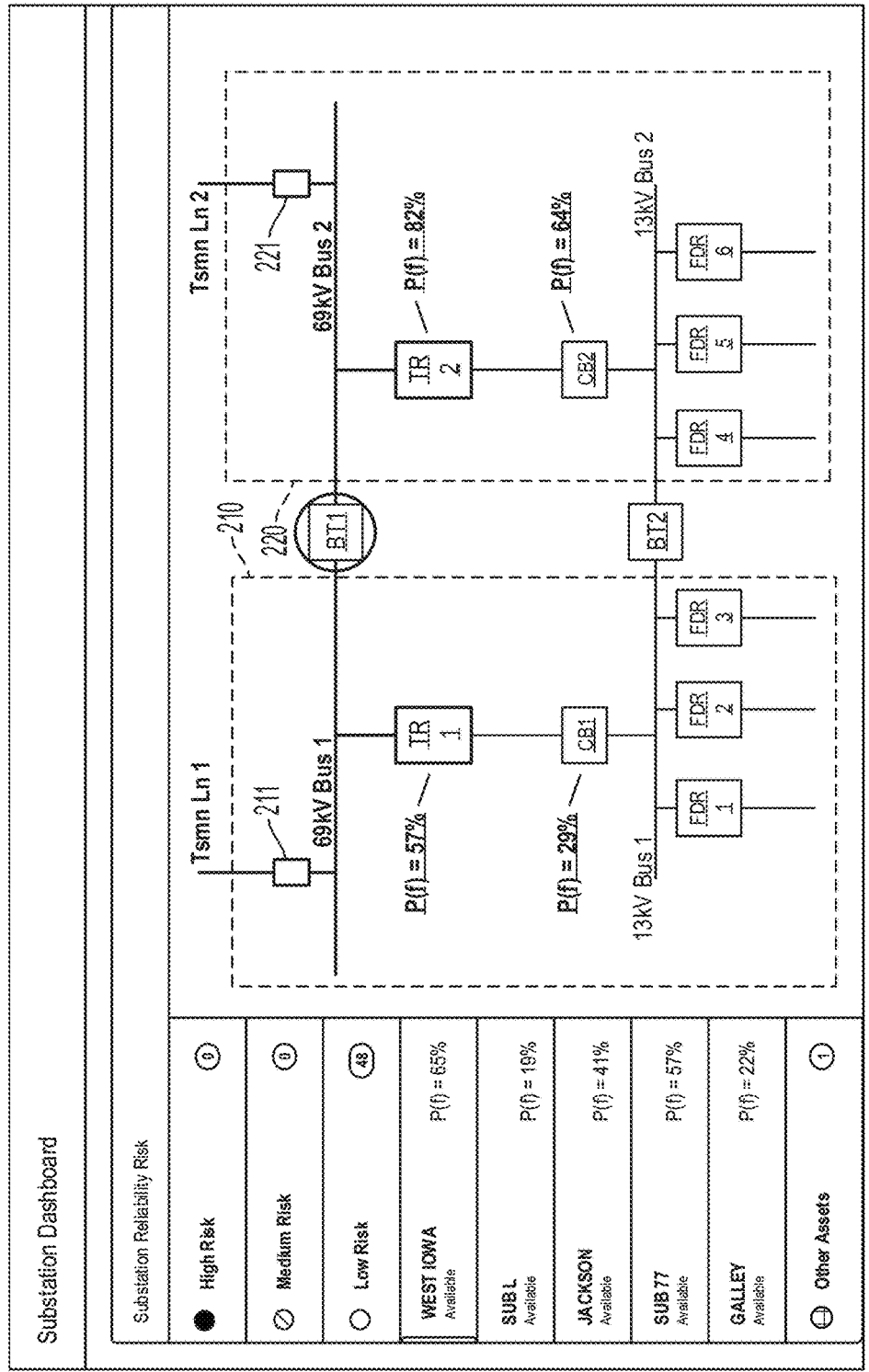
FIG. 12C is a snapshot of an example GUI depicting a visualization of an example electric power substation with example failure probabilities for individual assets, according to an example embodiment.
Figure 12D:
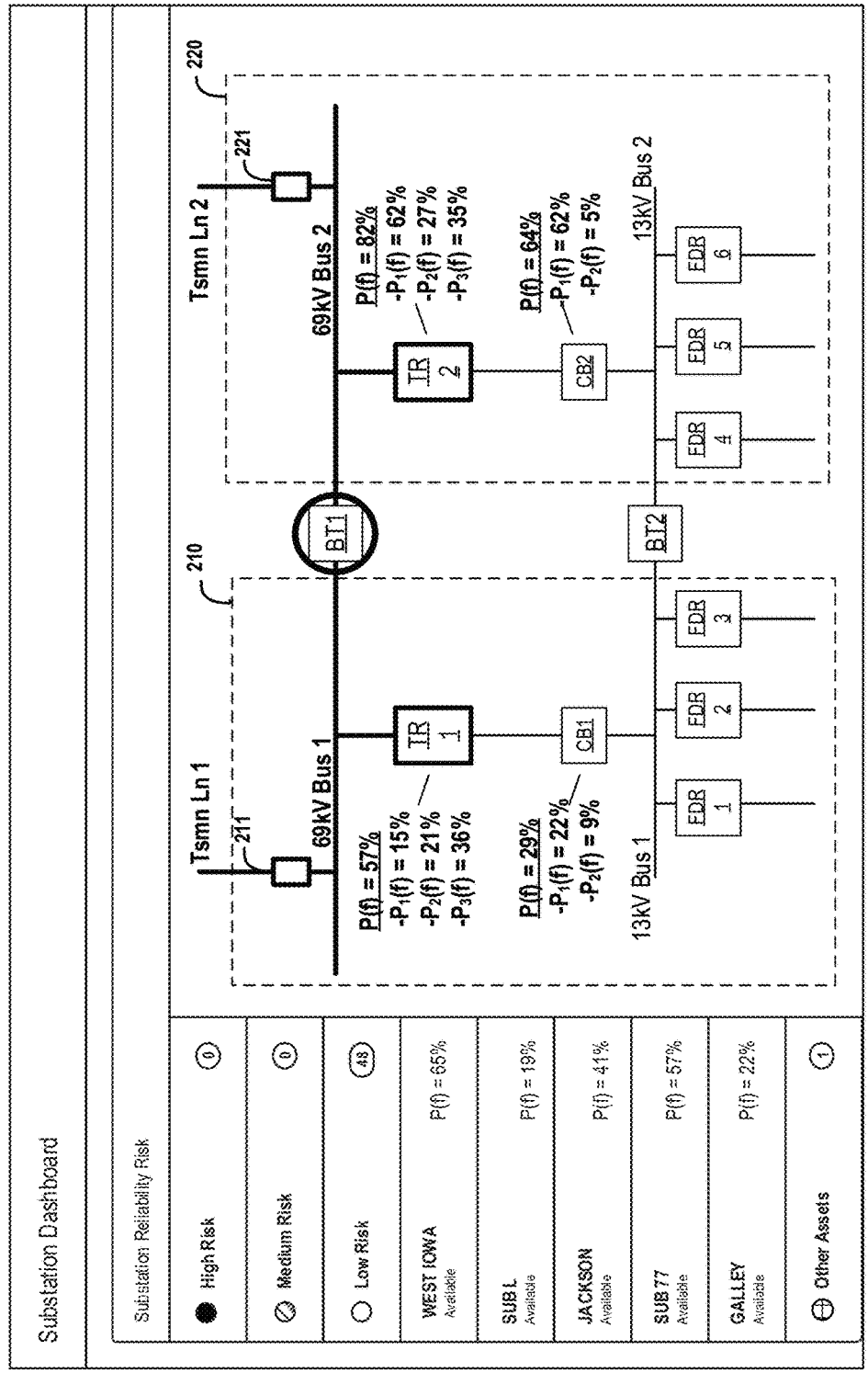
FIG. 12D is a snapshot of an example GUI depicting a visualization of an example electric power substation with example failure probabilities for individual assets and components associated with individual assets.

Additionally, the platform may be configured to display visualizations depicting schematics of individual substations that associate individual assets at a given substation with respective failure probabilities of these individual assets and/or respective failure probabilities of individual components associated with these individual assets. One example of this is depicted in FIG. 12C, which shows a snapshot 1220 that displays a schematic view of the West Iowa substation, along with indications of respective failure probabilities of the individual assets located at the West Iowa substation. Another example of this is depicted in FIG. 12D, which shows a snapshot 1230 that displays a schematic view of the West Iowa substation, along with indications of component-level failure probabilities associated with the individual assets located at the West Iowa substation and respective rolled-up, asset-level failure probabilities. Other ways to display visualizations depicting schematics of individual substations may be possible as well.

Figure 15:
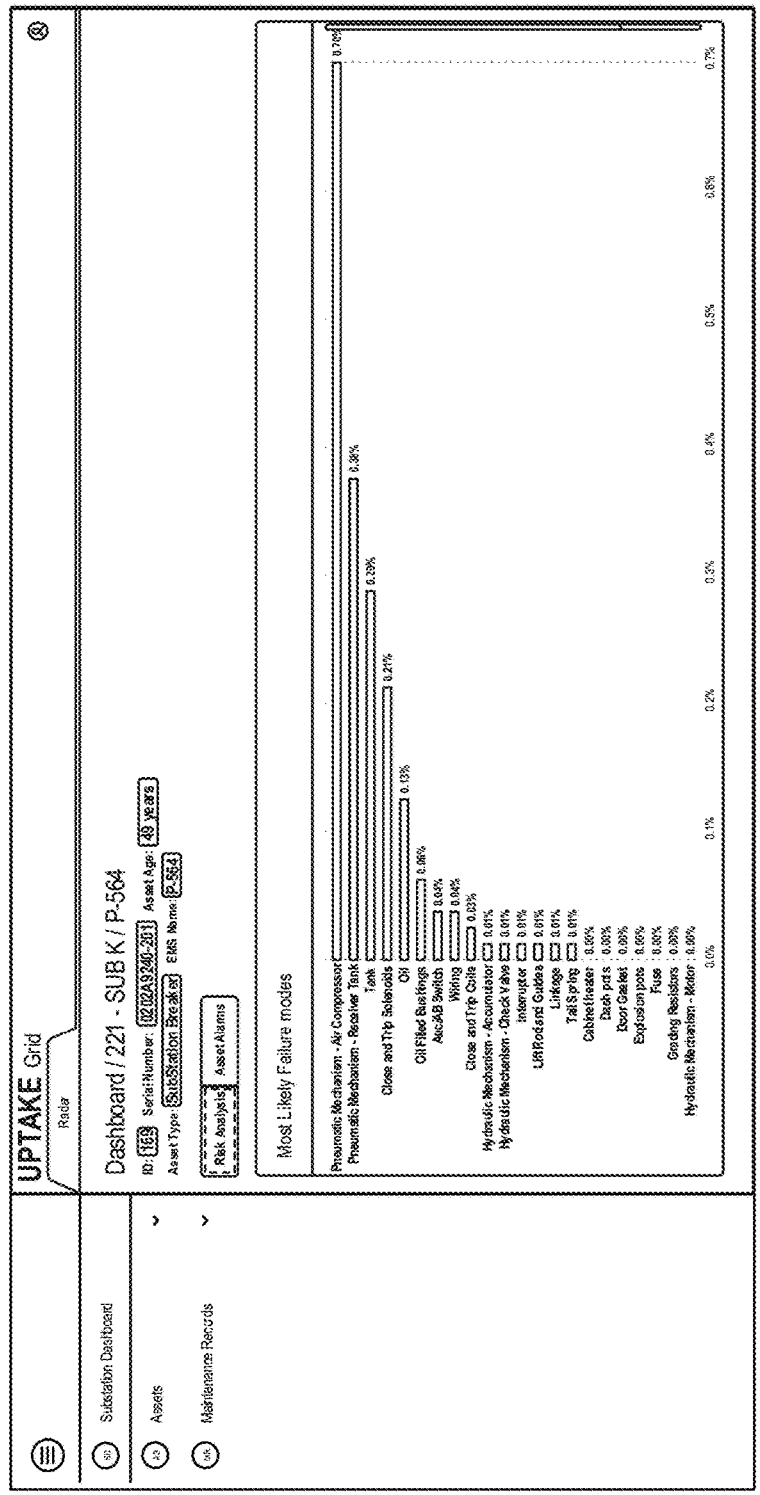
FIG. 15 is a snapshot of an example GUI depicting a visualization of an example electric power substation failure mode graph.

The platform may be configured to present other visualizations regarding individual components within each substation. For example, FIG. 15 shows a snapshot that depicts a list of various failure modes within a given substation. The failure modes are shown ordered according to the current likelihood of each failure mode to occur. Next to each failure mode is a bar, the length of which represents the relative likelihood of each failure mode occurring. Other ways to display various possible failure modes may be possible as well.

The platform may be configured to display a dashboard that presents a system-wide ordered list of individual substation assets displayed in order of the likelihood of a failure occurring at that asset. For instance, snapshot 1600 in FIG. 16 shows one example of this. In snapshot 1600, various assets are shown in a list. Alongside each asset is an indication of the substation in which that asset is located, a serial number or other identifying information for that asset, and a probability of failure occurring at that particular asset. In other examples, other information may be displayed as well. Further, the asset and/or the substation may be clickable or otherwise selectable by a user, such that when clicked or otherwise selected, the asset data platform may present a visualization specific to the asset or substation selected, such as one of the visualizations discussed herein previously, among other types of visualizations.

Asset data platform also present other visualizations depicting various other metrics associated with the substation. One such metric may be an "impact" or "consequence of failure" metric, which may represent an assessment of the relative harm that might result should a failure of the substation occur. The impact or consequence metric may take a categorical form, as in "high," "medium," or "low." For instance, the platform may assign a "low" impact of failure metric to a substation if a failure at that substation would result in relatively few outages but assign a "high" impact of failure metric if a failure at that substation would result in a relatively large number of outages or an outage of an important customer, such as a hospital. Asset data platform 302 may present the impact or consequence metric for a given substation alongside that substation's derived probability of failure so that an individual responsible for managing substations can take both factors into account when making decisions on how to service the various substations in the electrical system. For instance, a substation with a 0.50 probability of failure but an impact or consequence metric of "low" may be scheduled for service after a substation that has a lower probability of failure (e.g., 0.40) but a higher impact or consequence metric (e.g., "high"). Individuals may use the various metrics in other ways as well.

Advantageously, the disclosed process for determining and presenting a more intelligent measure of the probability of failure of a substation improves upon the existing technology for determining failure probabilities of individual assets at a substation based on age, which suffers from all of the problems discussed above. For example, unlike the existing technology for determining failure probabilities of individual assets within a substation, the disclosed process uses a data-driven approach to intelligently derive failure probabilities of the individual assets within the substation, aggregate these individual failure probabilities while accounting for the electrical configuration of the substation, and present the probability of substation failure and/or the respective failure probabilities for the individual assets to a user in one or more various ways. As another example, the disclosed approach may derive failure probabilities for individual assets by taking into account the historical operating conditions of the assets in relation to the other assets at the substation. Advantageously, a user may then use this probability of substation failure and/or the respective failure probabilities for the individual assets together with knowledge of the impact or consequence of a failure at the substation to make planning decisions, or the like, for the substation or the rest of the electrical system.

V. Conclusion

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans", "operators", "users" or other entities, this is for purposes of example and explanation only. The claims should not be construed as requiring action by such actors unless explicitly recited in the claim language.

What is claimed is:

1. A computing system comprising:
a communication interface;
at least one processor;
an asset data platform;
a non-transitory computer-readable medium;
and program instructions stored on the non-transitory computer-readable medium that are executable by the at least one processor such that the computing system is capable of:
deriving a respective failure probability for each asset of a set of assets operating in a substation;
determining an electrical configuration of the substation;
determining a failure probability of the substation based on (i) the respective failure probability for each asset of the set of assets and (ii) the electrical configuration of the substation;
and presenting a visualization that comprises: a visual representation of the determined failure probability of the substation, and
a visual representation of one or more of (i) the respective failure probability for each asset of the set of assets operating in the substation, or (ii) the determined electrical configuration of the substation;
wherein the presenting is performed utilizing the asset data platform;
wherein the visualization comprises: a navigable view and one or more selectable items related to the failure probability of the substation; and
wherein in response to the asset data platform receiving an indication of a selection of the one or more selectable items, additional information related to the failure probability of the substation is presented by the asset data platform.

2. The computing system of claim 1, wherein determining the electrical configuration of the substation comprises: identifying a plurality of redundant power paths within the substation and associating respective assets from the set of assets with one of the plurality of redundant power paths.

3. The computing system of claim 2, wherein determining the failure probability of the substation comprises: for each respective redundant power path within the substation, aggregating failure probabilities of respective assets associated with the respective redundant power path to thereby derive a respective failure probability for each redundant power path within the substation.

4. The computing system of claim 3, wherein, based on the aggregating, determining the failure probability of the substation comprises: based on the derived respective failure probabilities for each redundant power path within the substation, determining a probability of a failure occurring at each redundant power path within the substation.

5. The computing system of claim 1, further comprising program instructions stored on the non-transitory computer-readable medium that are executable by the at least one processor such that the computing system is capable of: assessing an electrical configuration exposure of the substation based on the determined electrical configuration of the substation; and based on the assessment, assigning to the substation a categorical measure of the electrical configuration exposure.

6. The computing system of claim 1, wherein deriving respective failure probabilities for each asset of a set of assets operating in a substation comprises: using the respective failure distribution for each asset of the set of assets to determine a respective probability of failure for each asset based on asset age.

7. The computing system of claim 1, wherein deriving a respective failure probability for each asset of a set of assets operating in a substation comprises: obtaining historical operating data for each asset of the set of assets; obtaining historical operating data for other assets, not part of the set of assets, operating in the substation; evaluating a relationship between the (i) the historical operating data for each asset of the set of assets and (ii) the historical operating data for the other assets; and based on the evaluated relationship, adjusting an existing failure distribution for each asset of the set of assets and using the adjusted failure distributions to derive a probability of failure for each asset.

8. A method comprising:
deriving a respective failure probability for each asset of a set of assets operating in a substation;
determining an electrical configuration of the substation;
determining a failure probability of the substation based on (i) the respective failure probability for each asset of the set of assets and (ii) the electrical configuration of the substation;
and presenting, utilizing an asset data platform, a visualization that comprises: a visual representation of the determined failure probability of the substation, and
a visual representation of one or more of (i) the respective failure probability for each asset of the set of assets operating in the substation, or (ii) the determined electrical configuration of the substation,
wherein the visualization comprises: a navigable view and one or more selectable items related to the failure probability of the substation; and
wherein in response to the asset data platform receiving an indication of a selection of the one or more selectable items, additional information related to the failure probability of the substation is presented by the asset data platform.

9. The method of claim 8, wherein determining the electrical configuration of the substation comprises: identifying a plurality of redundant power paths within the substation and associating respective assets from the set of assets with one of the plurality of redundant power paths.

10. The method of claim 9, wherein determining the failure probability of the substation comprises: for each respective redundant power path within the substation, aggregating failure probabilities of respective assets associated with the respective redundant power path to thereby derive a respective failure probability for each redundant power path within the substation.

11. The method of claim 10, wherein, based on the aggregating, determining the failure probability of the substation comprises: based on the derived respective failure probabilities for each redundant power path within the substation, determining a probability of a failure occurring at each redundant power path within the substation.

12. The method of claim 8, further comprising: assessing an electrical configuration exposure of the substation based on the determined electrical configuration of the substation; and
based on the assessment, assigning to the substation a categorical measure of the electrical configuration exposure.

13. The method of claim 8, wherein deriving respective failure probabilities for each asset of a set of assets operating in a substation comprises: using the respective failure distribution for each asset of the set of assets to determine a respective probability of failure for each asset based on asset age.

14. The method of claim 8, wherein deriving a respective failure probability for each asset of a set of assets operating in a substation comprises: obtaining historical operating data for each asset of the set of assets; obtaining historical operating data for other assets, not part of the set of assets, operating in the substation; evaluating a relationship between the (i) the historical operating data for each asset of the set of assets and (ii) the historical operating data for the other; and based on the evaluated relationship, adjusting an existing failure distribution for each asset of the set of assets and using the adjusted failure distributions to derive a probability of failure for each asset.

15. A non-transitory computer-readable storage medium having program instructions stored thereon that are executable by a computing system such that the computing system is capable of:
deriving a respective failure probability for each asset of a set of assets operating in a substation;
determining an electrical configuration of the substation;
determining a failure probability of the substation based on (i) the respective failure probability for each asset of the set of assets and (ii) the electrical configuration of the substation;
and presenting, utilizing an asset data platform, a visualization that comprises: a visual representation of the determined failure probability of the substation, and
a visual representation of one or more of (i) the respective failure probability for each asset of the set of assets operating in the substation, or (ii) the determined electrical configuration of the substation,
wherein the visualization comprises: a navigable view and one or more selectable items related to the failure probability of the substation; and
wherein in response to the asset data platform receiving an indication of a selection of the one or more selectable items, additional information related to the failure probability of the substation is presented by the asset data platform.

16. The non-transitory computer-readable storage medium of claim 15, wherein determining the failure probability of the substation comprises: identifying a plurality of redundant power paths within the substation and associating respective assets from the set of assets with one of the plurality of redundant power paths; and for each respective redundant power path within the substation, aggregating the failure probabilities of the respective assets associated with the respective redundant power path to thereby derive a respective failure probability for each redundant power path within the substation.

17. The non-transitory computer-readable storage medium of claim 16, wherein, based on the aggregating, determining the failure probability of the substation comprises:
based on the derived respective failure probabilities for each redundant power path within the substation, determining a probability of a failure occurring at each redundant power path within the substation.

18. The non-transitory computer-readable storage medium of claim 15, wherein the program instructions are further executable by the at least one processor such that the computing system is capable of: assessing an electrical configuration exposure of the substation based on the determined electrical configuration of the substation; and based on the assessment, assigning to the substation a categorical measure of the electrical configuration exposure.

19. The non-transitory computer-readable storage medium of claim 15, wherein deriving respective failure probabilities for each asset of a set of assets operating in a substation comprises: using a respective failure distribution for each asset of the set of assets to determine a respective probability of failure for each asset based on asset age.

20. The non-transitory computer-readable storage medium of claim 15, wherein deriving a respective failure probability for each asset of a set of assets operating in a substation comprises:

obtaining historical operating data for each asset of the set of assets; obtaining historical operating data for other assets, not part of the set of assets, operating in the substation; evaluating a relationship between the (i) the historical operating data for each asset of the set of assets and (ii) the historical operating data for the other assets; and based on the evaluated relationship, adjusting an existing failure distribution for each asset of the set of assets and using the adjusted failure distributions to derive a probability of failure for each asset.

* * * * *